United States Patent
Mathews et al.

(10) Patent No.: US 12,340,799 B2
(45) Date of Patent: Jun. 24, 2025

(54) IDENTIFYING AND CORRECTING AUTOMATIC SPEECH RECOGNITION (ASR) MISRECOGNITIONS IN A DECENTRALIZED MANNER

(71) Applicant: GOOGLE LLC, Mountain View, CA (US)

(72) Inventors: Rajiv Mathews, Sunnyvale, CA (US); Rohit Prabhavalkar, Santa Clara, CA (US); Giovanni Motta, San Jose, CA (US); Mingqing Chen, Saratoga, CA (US); Lillian Zhou, Mountain View, CA (US); Dhruv Guliani, San Francisco, CA (US); Harry Zhang, Sunnyvale, CA (US); Trevor Strohman, Sunnyvale, CA (US); Françoise Beaufays, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 180 days.

(21) Appl. No.: 17/958,887

(22) Filed: Oct. 3, 2022

(65) Prior Publication Data
US 2024/0112673 A1    Apr. 4, 2024

(51) Int. Cl.
*G10L 15/00* (2013.01)
*G10L 15/06* (2013.01)
(Continued)

(52) U.S. Cl.
CPC .......... *G10L 15/197* (2013.01); *G10L 15/063* (2013.01); *G10L 15/22* (2013.01);
(Continued)

(58) Field of Classification Search
CPC ........ G10L 15/00; G10L 15/22; G10L 15/065
See application file for complete search history.

(56) References Cited

U.S. PATENT DOCUMENTS

| 9,703,892 B2 | 7/2017 | Ramer et al. |
| 10,152,298 B1 | 12/2018 | Salvador |

(Continued)

FOREIGN PATENT DOCUMENTS

| EP | 3389045 | 10/2018 |
| WO | 2018184214 | 10/2018 |

(Continued)

OTHER PUBLICATIONS

European Patent Office; International Search Report and Written Opinion issued in Application No. PCT/US2023/027036; 11 pages; dated Oct. 6, 2023.

(Continued)

*Primary Examiner* — Feng-Tzer Tzeng
(74) *Attorney, Agent, or Firm* — Gray Ice Higdon

(57) ABSTRACT

Implementations described herein identify and correct automatic speech recognition (ASR) misrecognitions. For example, on-device processor(s) of a client device may generate a predicted textual segment that is predicted to correspond to spoken utterance of a user of the client device, and may receive further input that modifies the predicted textual segment to an alternate textual segment. Further, the on-device processor(s) may store these textual segments in on-device storage as a candidate correction pair, and transmit the candidate correction pair to a remote system. Moreover, remote processor(s) of the remote system may determine that the candidate correction pair is an actual correction pair, and may cause client devices to generate updates for a global ASR model for the candidate correction pair. Additionally, the remote processor(s) may distribute the global ASR model to the client devices and/or additional client devices.

20 Claims, 8 Drawing Sheets

(51) Int. Cl.
*G10L 15/197* (2013.01)
*G10L 15/22* (2006.01)
*G10L 15/30* (2013.01)

(52) U.S. Cl.
CPC .............. *G10L 15/30* (2013.01); *G10L 15/00* (2013.01); *G10L 2015/0635* (2013.01)

(56) References Cited

U.S. PATENT DOCUMENTS

| | | |
|---|---|---|
| 10,325,596 B1 | 6/2019 | Tran et al. |
| 10,335,572 B1 | 7/2019 | Kumar |
| 10,388,272 B1 | 8/2019 | Thomson et al. |
| 2012/0150532 A1 | 6/2012 | Mirowski et al. |
| 2012/0277893 A1 | 11/2012 | Davis et al. |
| 2013/0080164 A1* | 3/2013 | Zanolin ................ G06F 40/232 704/E15.044 |
| 2014/0365226 A1 | 12/2014 | Sinha |
| 2015/0127346 A1 | 5/2015 | Gruenstein et al. |
| 2016/0267380 A1 | 9/2016 | Gemello et al. |
| 2017/0312614 A1 | 11/2017 | Tran et al. |
| 2018/0232662 A1 | 8/2018 | Solomon et al. |
| 2019/0115026 A1 | 4/2019 | Sharifi |
| 2019/0304459 A1 | 10/2019 | Howard et al. |
| 2019/0339784 A1 | 11/2019 | Lemay et al. |
| 2020/0057287 A1 | 2/2020 | Tsakalakos et al. |
| 2021/0327410 A1* | 10/2021 | Beaufays ............ G06F 3/04883 |

FOREIGN PATENT DOCUMENTS

| | | |
|---|---|---|
| WO | 2018212941 | 11/2018 |
| WO | 2019212567 | 11/2019 |
| WO | WO-2022010471 A1 * | 1/2022 ............. G10L 15/01 |

OTHER PUBLICATIONS

Brownlee; A Gentle Introduction to Exploding Gradients in Neural Networks; XPO55813789; Retrieved from the Internet: https://web.archive.org/web/20180709092622/https://machinelearningmastery.com/exploding-gradients-in-neural-networks/; dated Dec. 8, 2017.
Brownlee; How to Implement the Backpropagation Algorithm from Scratch in Python; XP055813704; Retrieved from the Internet; https://web.archive.org/web/2019062005443/https://machinelearningmastery.com/implement-backpropagation-algorithm-scratch-python/; dated Nov. 7, 2016.

* cited by examiner

IDENTIFYING AND CORRECTING AUTOMATIC SPEECH RECOGNITION (ASR) MISRECOGNITIONS IN A DECENTRALIZED MANNER

BACKGROUND

Voice-based user interfaces are increasingly being used in the control of computers and other electronic devices. Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces perform speech recognition (e.g., using an automatic speech recognition (ASR) model) on a spoken utterance to generate corresponding text, perform a semantic analysis of the text in an attempt to determine the meaning of the spoken utterance, and undertake one or more actions based on the determined meaning.

While speech recognition performance has continued to improve, inaccurate speech recognition can still occur for many situations. As a non-limiting example, inaccurate speech recognition can occur for new terms and/or for terms that are relatively infrequent (or non-existent) in a training corpus on which an ASR model is trained. In an attempt to effectively recognize new terms and/or infrequent terms, techniques have been proposed to generate additional speech recognition hypotheses that are in addition to an initial hypothesis (or initial hypotheses), and consider the additional speech recognition hypotheses as candidates for speech recognition. However, such techniques require additional post-processing, and can still fail to lead to effective recognition of many terms in many situations, such as when the initial hypothesis/hypotheses are too far off-base and/or when a word lexicon for the additional hypotheses does not include certain terms.

Moreover, inaccurate speech recognition can be exacerbated when speech recognition is performed on-device (i.e., on a client device). This can be due to, for example, an on-device ASR model being less robust than a cloud-based, global ASR model, on-device memory and/or processor resources being more constrained than cloud-based resources, and/or additional hypotheses generation lexicons being more constrained on-device. However, in many circumstances it would be beneficial to perform speech recognition on-device rather than remotely in light of technical considerations that may include performance, data security and network usage.

Some techniques have been proposed to identify and correct inaccurate speech recognition, but these techniques have shortcomings. For example, some techniques may monitor user interactions with a transcription that includes corresponding text generated based on processing audio data that captures a spoken utterance of a user. In these examples, the user interactions may modify the corresponding text to alternate text, and these modifications may be considered corrections. However, in providing the spoken utterance and subsequently modifying the corresponding text thereof, users may change their minds. Accordingly, assuming that these modifications are corrections to inaccurate speech recognition may be a poor assumption. Further, some techniques also consider phonetic similarity and/or Levenshtein edit distance between the corresponding text and these modifications. These techniques may provide a better indication of whether these modifications are corrections to inaccurate speech recognition, but are generally employed on a user-by-user basis and fail to consider whether another user would make the same correction. As a result, there is a need in the art for improved techniques in identifying inaccurate speech recognition and learning from them, and doing so in a privacy sensitive manner.

SUMMARY

Implementations described herein are directed to identifying and correcting automatic speech recognition (ASR) misrecognitions in a decentralized manner. For example, on-device processor(s) of a client device may receive audio data that captures a spoken utterance of a user of the client device, process the audio data using an on-device ASR model (e.g., stored in on-device storage of the client device) to generate a predicted textual segment that is predicted to correspond to the spoken utterance captured in the audio data, and cause the predicted textual segment to be visually rendered for presentation to the user via a display of the client device. Further, the on-device processor(s) may receive further user interface input (e.g., an additional spoken utterance, touch input, typed input, and/or other input) that modifies a portion of the predicted textual segment to an alternate textual segment. In response to receiving the further user interface input that modifies the portion of the predicted textual segment to the alternate textual segment, the on-device processor(s) may store (e.g., in the on-device storage of the client device) the portion of the predicted textual segment that was modified and the alternate textual segment as a corresponding candidate correction pair, and store (e.g., in the on-device storage of the client device) the audio data that was processed to generate the predicted textual segment (and optionally in association with the candidate correction pair). Moreover, the on-device processor(s) may transmit the corresponding candidate correction pair to a remote system and without transmitting the audio data to the remote system. In some implementations, the on-device processor(s) may only transmit the corresponding candidate correction pair to the remote system in response to a threshold quantity of occurrences of the candidate correction pair being detected at the client device. In additional or alternative implementations, the on-device processor(s) may only transmit the corresponding candidate correction pair to the remote system in response to the candidate correction pair being included on a list of candidate correction pairs that is received from the remote system and that includes candidate correction pairs that have been detected at other client devices. Corresponding additional on-device processor(s) of a plurality of additional client devices (e.g., that are in addition to the client device) may perform the same or similar operations described above, and may transmit additional corresponding candidate correction pairs to the remote system in the same or similar circumstances described above.

Further, remote processor(s) of the remote system may determine whether a given corresponding candidate correction pair received from the client device and/or one or more of the plurality of client devices is, in fact, an actual correction pair (i.e., where the modification of the portion of the predicted textual segment to the alternate textual segment corrects an ASR misrecognition by the on-device ASR model(s) of the client device and the plurality of additional client devices). For example, the remote processor(s) may determine that the given corresponding candidate correction pair is an actual correction pair based on a threshold quantity of occurrences of the corresponding candidate correction pair being received from the client device and/or one or more of the plurality of additional client devices. Additionally, or alternatively, the remote processor(s) may determine that the corresponding candidate correction pair is an actual correction based on query activity associated with the plurality of client devices, such as based on the query activity indicating that a threshold quantity of queries that include the alternate textual segment have been submitted by users of the client device and/or one or more of the plurality of additional client devices and optionally over a threshold duration of time and/or within a particular geographical region (i.e., a query spike). Notably, any corrections in query activity may also be transmitted to the remote system and from the client devices that detect these corrections in the query activity.

In various implementations, and in response to determining that the given corresponding candidate correction pair corresponds to an actual correction, the remote processor(s) may identify a subset of client devices, from among the client device and/or one or more of the plurality of additional client devices, that provided the given corresponding candidate correction pair that is determined to correspond to an actual correction pair, and may cause a global ASR model, that is a global-based counterpart of the corresponding ASR model(s) of the client device and/or one or more of the plurality of additional client devices and that is stored in remote memory of the remote system, to be updated in a decentralized manner and utilizing the subset of client devices. For example, the remote processor(s) may transmit an indication that the global ASR model is to be updated in the decentralized manner and based on the given corresponding candidate correction pair.

Moreover, on-device processor(s) of a given client device that was identified for inclusion in the subset may generate a corresponding update for the global ASR model and with respect to the given corresponding candidate correction pair. For example, the on-device processor(s) may obtain (e.g., from given on-device storage of the given client device) corresponding audio data that was previously stored in the given on-device storage of the given client device. Further, the on-device processor(s) may generate, based on processing the corresponding audio data and using the corresponding on-device ASR model, a corresponding update for the global ASR model. For example, the on-device processor(s) may process, using the corresponding on-device ASR model, the corresponding audio data to generate a corresponding additional predicted textual segment, and may generate the corresponding update based on comparing the corresponding additional predicted textual segment and the alternate textual segment that was previously stored in association with the given corresponding candidate correction pair locally at the given client device. Additionally, or alternatively, the on-device processor(s) may process, using only a subset of machine learning (ML) layers of the corresponding on-device ASR model (e.g., input layer(s) and/or encoding layer(s) of the corresponding on-device ASR model but not joint layer(s), decoding layer(s), and/or or output layer(s) of the corresponding on-device ASR model, input layer(s) and joint layer(s) of the corresponding on-device ASR model but not output layer(s) of the corresponding on-device ASR model, etc.), the corresponding audio data to generate a corresponding representation of the corresponding audio data, and may perform various forward and/or backward passes across the subset of ML layers of the corresponding on-device ASR model. In these examples, the subset of the ML layers may be updated based on the processing while other layers are fixed and the difference between the subset of the ML layers prior to being updated and subsequent to being updated (or a difference in one or more on-device weights associated with the subset of the ML layers prior to being updated and subsequent to being updated) may correspond to the corresponding update for the global ASR model. In these examples, only the subset of the ML layers may be updated in this manner to prioritize conservation of computational resources at the given client device.

Additionally, the remote processor(s) may receive, from each of the client devices identified for inclusion in the subset, the corresponding updates for the global ASR model. Further, the remote processor(s) may update the global ASR model based on the corresponding updates received from each of the client devices identified for inclusion in the subset. Moreover, the remote processor(s) may distribute the updated global ASR model to a plurality of client devices (e.g., to the client devices identified for inclusion in the subset, additional client devices, and/or further additional client devices), which causes the plurality of client devices to update the corresponding on-device ASR models.

Accordingly, based on techniques described herein, not only is the global ASR model updated in a decentralized manner to address ASR misrecognitions, but the ASR misrecognitions themselves are also identified in a decentralized manner. Put another way, techniques described herein enable identification of ASR misrecognitions based on modifications across a population of client devices, rather than considering modifications at a single client device (e.g., using phonetic similarity, Levenshtein edit distance, etc.), to differentiate between scenarios where a given user changes their mind and/or scenarios where the modifications may not be due to ASR misrecognitions. Further, techniques described herein enable correction of these ASR misrecognitions by causing client devices across the population to generate updates for the global ASR model. In turn, the global ASR model may be distributed back across the population of client devices to replace the corresponding on-device ASR models, thereby obviating and/or mitigating future occurrences of these ASR misrecognitions in on-device speech processing using the corresponding on-device ASR models. As a result, the corresponding on-device ASR models are more robust to these ASR misrecognitions in that they may more readily recognize new terms and/or phrases that are newly added to the word lexicon of the users of the client devices, or new terms and/or phrases for which the corresponding on-device ASR models have previously trained to recognize.

For instance, assume that a given user of a given client device provides a spoken utterance of "I tested positive for COVID and will miss the meeting". However, in processing audio data that captures the spoken utterance, further assume that a corresponding on-device ASR model stored locally in on-device storage of the given client device, misrecognized "COVID" as "covet". Accordingly, the given user may provide further user interface input that modifies "covet" to "COVID" as intended by the given user in providing the spoken utterance. In this instance, the portion of the predicted textual segment may be "covet" and the alternate textual segment may be "COVID", and a corresponding candidate correction pair of [covet, COVID] may be stored in the on-device storage of the given client device and optionally in association with the audio data that captures the spoken utterance. Further, in this instance, the corresponding candidate correction pair of [covet, COVID] may be transmitted to the remote system, and optionally in response to determining that a threshold quantity of occurrence of the candidate correction pair of [covet, COVID] have been detected at the given client device and/or that the candidate correction pair of [covet, COVID] is included in a list of candidate correction pairs that is received from the remote system (e.g., indicating that other client devices also have detected occurrences of the candidate correction pair of [covet, COVID]).

In this instance, further assume that the remote system receives the corresponding candidate correction pair of [covet, COVID] from the given client device and a plurality of additional occurrences of the corresponding candidate correction pair of [covet, COVID] from a plurality of additional client devices that are in addition to the given client device. In some of these instances, the remote system may determine that the corresponding candidate correction pair of [covet, COVID] is an actual correction pair based on a threshold quantity of occurrences of the corresponding candidate correction pair of [covet, COVID] being received from the given client device and/or the plurality of additional client devices. In additional or alternative instances, the remote system may determine that the corresponding candidate correction pair of [covet, COVID] is an actual correction pair based on corresponding users of the given client device and/or the plurality of additional client devices submitting queries that include the term "COVID" (and optionally based on the term "COVID" being modified in that query activity). Accordingly, the remote system may determine that the corresponding candidate correction pair of [covet, COVID] is, in fact, an actual correction pair. As a result, the remote system may instruct the given client device, and any other client device that provided the corresponding correction pair of [covet, COVID] to generate a corresponding update for a global ASR model to obviate and/or mitigate ASR misrecognitions of "COVID" as "covet".

In this instance, further assume that the given client device receives an indication to generate a corresponding update for the global ASR model. The given client device may obtain, from the given on-device storage of the given client device, at least a portion of the corresponding candidate correction pair of [covet, COVID] and the audio data that captures the spoken utterance that was stored in the on-device storage of the given client device (e.g., the audio data capturing the spoken utterance of "I tested positive for COVID and will miss the meeting"). In some of these instances, the given client device may process, using the corresponding on-device ASR model, the audio data to generate an additional predicted textual segment that is predicted to correspond to the spoken utterance, and may compare the additional predicted textual segment to the alternate textual segment to generate the corresponding update for the global ASR model. Put another way, the given client device may utilize the alternate textual segment (e.g., the alternate textual segment of "COVID") as a supervision signal in generating the corresponding update for the global ASR model. In additional or alternative instances, the given client device may process, using a subset of the ML layers of the corresponding on-device ASR model, the audio data to generate a corresponding representation of the audio data, and may perform various forward and/or backward passes across the subset of ML layers of the corresponding on-device ASR model to update the subset of the ML layers based on, for example, one or more gradients generated based on performance of the various forward and/or backward passes across the subset of ML layers of the corresponding on-device ASR model. The other client devices that provided the corresponding candidate correction pair of [covet, COVID] to the remote system may generate the corresponding updates in the same or similar manner, and the remote system may update the global ASR model based on the corresponding updates received from the plurality of client devices.

Notably, in the above instance, had the further user input provided by the given user modified the portion of the predicted textual segment from "covet" to "an illness", then the corresponding candidate correction pair of [covet, an illness] may be stored in the on-device storage of the given client device and optionally in association with the audio data that captures the spoken utterance, and the corresponding candidate correction pair of [covet, an illness] may be transmitted to the server. However, in this instance, it is unlikely that the remote system would receive as many occurrences of the corresponding candidate correction pair of [covet, an illness] (e.g., when compared to the corresponding candidate correction pair of [covet, COVID]) since this represents an occurrence of the given user changing their mind (e.g., specifying "an illness" instead of "COVID") and different users may change their minds in different manners. Accordingly, only the corresponding candidate correction pairs that are, in fact, indicative of ASR misrecognitions should be identified by the remote system. Nonetheless, in various implementations, techniques described herein may be utilized in conjunction with other techniques to identify and/or verify the ASR misrecognitions (e.g., phonetic similarity, Levenshtein edit distance, etc.).

By implementing techniques described herein, one or more technical advantages may be achieved. As one non-limiting example, techniques described herein enable actual ASR misrecognitions to be quickly and efficiently identified by considering candidate ASR misrecognitions across a population of client devices. By considering the candidate ASR misrecognitions across the population of client devices, rather than on a device-by-device basis, the actual ASR misrecognitions may be quickly and efficiently distinguished from situations where respective users of the client devices simply changed their minds. As another non-limiting example, techniques described herein enable ASR models to be updated in a manner that ensures security of user data since audio data (e.g., on which the ASR misrecognitions are based) remains exclusively on the client devices, but may still be leveraged in generating updates for the ASR models as described herein. As a result, the ASR models described herein obviate and/or mitigate occurrences of ASR misrecognitions in a manner that maintains security of user data.

The above description is provided as an overview of only some implementations disclosed herein. Those implementations, and other implementations, are described in additional detail herein.

DETAILED DESCRIPTION

Figure 1A:
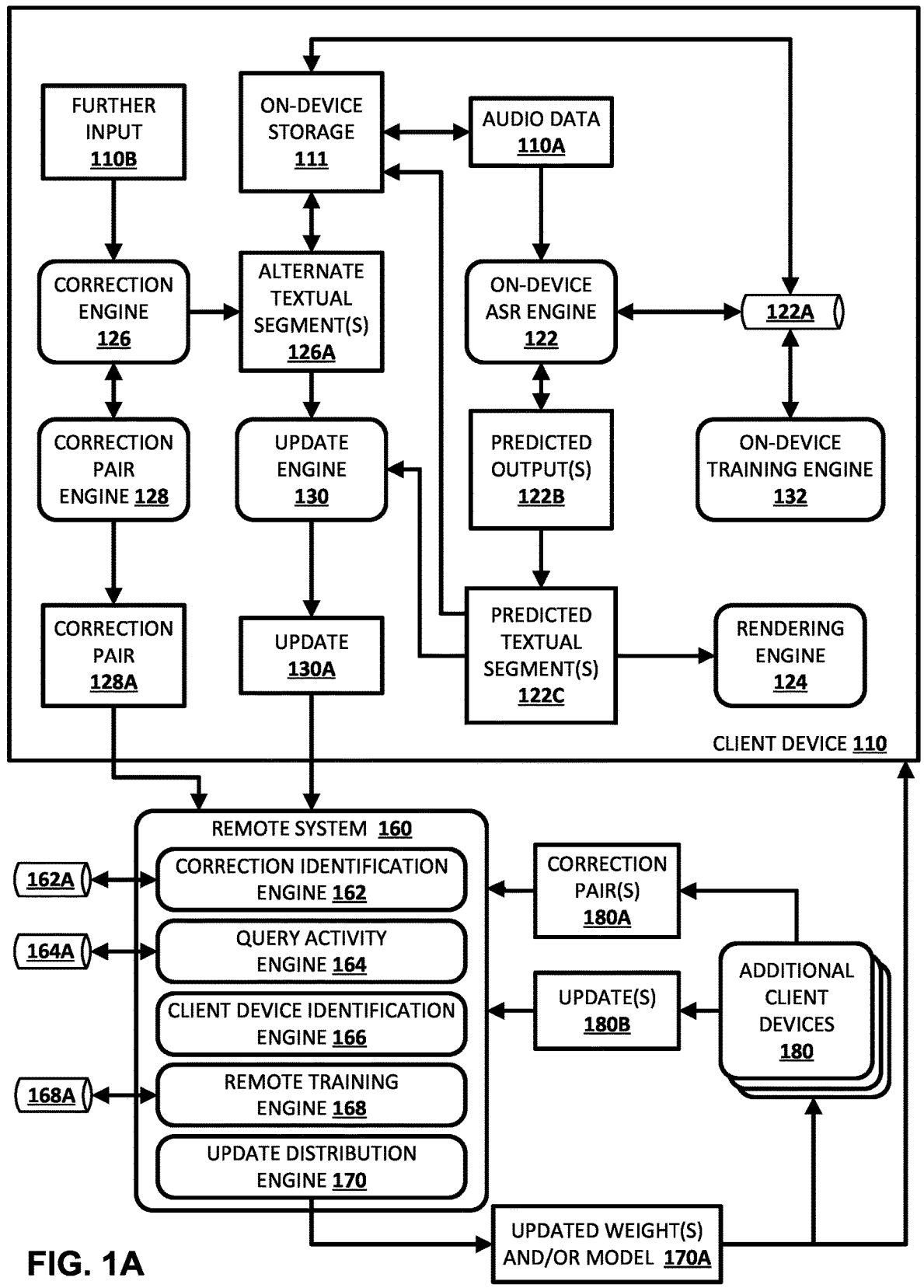
FIG. 1A depicts an example process flow that demonstrates various aspects of the present disclosure, in accordance with various implementations.

Turning now to FIG. 1A, an example process flow that demonstrates various aspects of the present disclosure is depicted. A client device 110 is illustrated in FIG. 1A, and includes the components that are encompassed within the box of FIG. 1A that represents client device 110. On-device automatic speech recognition (ASR) engine 122 may receive audio data 110A that corresponds to a spoken utterance of a user of the client device 110 and that is generated via one or more microphones of the client device 110. The on-device ASR engine 122 may process the audio data 110A, using an on-device ASR model 122A that is stored in on-device storage 111 of the client device 110 (e.g., random-access memory (RAM) and/or other types of volatile memory or storage device), to generate one or more predicted outputs 122B. Further, the on-device ASR engine 122 may generate one or more predicted textual segments 122C based on the one or more predicted outputs 122B.

For example, when the on-device ASR model 122A is an end-to-end speech recognition model, the on-device ASR engine 122 may generate the one or more predicted textual segments 122C directly using the on-device ASR model 122A (e.g., the one or more predicted outputs 122B may correspond to the one or more predicted textual segments 122C). For instance, the on-device ASR model 122A may be an end-to-end model used to generate the one or more predicted textual segment 122C on a character-by-character basis (or other token-by-token basis) as the one or more predicted outputs 122B. One non-limiting example of such an end-to-end model used to generate the one or more predicted textual segments 122C on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, mel-frequency cepstral coefficients (MFCCs), or other representations of the audio data 110A) to produce the one or more predicted textual segments 122C, an RNN-T model can be used to continuously process input samples and stream output symbols (e.g., characters of the alphabet). Also, for example, when the on-device ASR model 122A is not an end-to-end speech recognition model, the on-device ASR engine 122 may instead generate the one or more predicted outputs 122B, such as one or more predicted phonemes and/or other representations, and may generate the one or more predicted outputs 122C based on the one or more predicted outputs 122B. For instance, with such models, one or more predicted phonemes and/or other representations may be utilized by the on-device ASR engine 122 to determine the one or more predicted textual segments 122C that conform to the one or more predicted phonemes. In doing so, the on-device ASR engine 122 may optionally employ a decoding graph, a lexicon, and/or other resource(s).

Moreover, rendering engine 124 can visually render the one or more predicted textual segments 122C for presentation to the user of the client device 110 via a display, and optionally audibly render the one or more predicted textual segments 122C for presentation to the user of the client device 110 via one or more speakers of the client device 110. In various implementations, further input 110B that is in addition to the spoken utterance initially provided by the user of the client device 110 may be received at the client device 110. The further input 110B may include, for example, touch input and/or typed input directed to the display of the client device 110 and/or an additional spoken utterance captured in additional audio data generated by the one or more microphones of the client device 110. In these implementations, correction engine 126 may analyze the further input 110B to determine whether the further input 1106 modifies a portion of the one or more predicted textual segments 122C to one or more alternate textual segments 126A. Further, and assuming that the further input 1106 modifies a portion of the one or more predicted textual segments 122C to one or more alternate textual segments 126A, correction pair engine 128 may generate a correction pair 128A that includes at least the portion of the one or more predicted textual segments 122C that were modified and the one or more alternate textual segments 126A. Moreover, the correction pair engine 128 may cause the correction pair 128A to be stored in the on-device storage 111 of the client device 110, and the audio data 110A may be stored in the on-device storage 111 of the client device 110 (and optionally in association with the correction pair 128A). Additionally, the correction pair engine 128 may cause the correction pair 128A to be transmitted to a remote system 160 and without transmitting the audio data 110A to the remote system (and optionally in response to determining that a threshold quantity of occurrences of the corrections pair 128 have been detected at the client device 110). However, despite the further input 110B modifying the portion of the one or more predicted textual segments 122C to the one or more alternate textual segments 126A, the correction pair 128A may not yet be considered an actual correction pair, and may be referred to as a candidate correction pair.

In various implementations, a correction identification engine 162 may store the correction pair 128A and one or more additional correction pairs 180A received from one or more additional client devices 180 in a correction pair database 162A along with an indication of the client device 110 that provided the correction pair 128A (e.g., a list of candidate correction pairs stored in the correction pair database 162A and indexed based on different textual segments included in the correction pairs that may be distributed to a plurality of client devices). Further, the correction identification engine 162 may analyze the correction pair 128A and the one or more additional correction pairs 180A to determine whether any of the correction pairs (e.g., stored in the correction pair database 162A) correspond to an actual correction pair. In some versions of those implementations, the correction identification engine 162 may determine that the correction pair 128A is an actual correction pair based on a threshold quantity of occurrences of the correction pair 128A being received from the client device 110 and other client devices (e.g., from one or more of the additional client devices 180). For example, and as described in more detail with respect to FIG. 6A, assume that the correction pair 128A includes a portion of a predicted textual segment corresponding to "covet" that was subsequently modified to an alternate textual segment of "COVID" (e.g., a correction pair of [covet, COVID]). In this example, further assume that several thousand correction pairs indicating that "covet" has been corrected to "COVID" have been identified by the correction identification engine 162 (e.g., from among the correction pair 128A and the one or more correction pairs 180A), and that these several thousand occurrences satisfy the threshold quantity of occurrences for considering the correction pair of [covet, COVID] an actual correction pair. Accordingly, in this example, the correction identification engine 162 may consider the correction pair of [covet, COVID] as an actual correction pair indicative of a common ASR misrecognition across a population of client devices.

In contrast, and as described in more detail with respect to FIG. 6B, assume that the correction pair 128A includes a portion of a predicted textual segment corresponding to "covet" that was subsequently modified to an alternate textual segment of "an illness" (e.g., a correction pair of [covet, an illness]). In this example, further assume that only several hundred correction pairs indicating that "covet" has been corrected to "an illness" have been identified by the correction identification engine 162 (e.g., from among the correction pair 128A and the one or more correction pairs 180A), but that these several hundred occurrences fail to satisfy the threshold quantity of occurrences for considering the correction pair of [covet, an illness] an actual correction pair. Accordingly, in this example, the correction identification engine 162 may not consider the correction pair of [covet, an illness] as an actual correction pair indicative of a common ASR misrecognition across a population of client devices. Rather, in this example, the correction pair of [covet, an illness] may simply be indicative of users changing their minds with respect to spoken utterances that were initially provided, but modified based on further inputs for other reasons than ASR misrecognitions.

In additional or alternative versions of those implementations, the correction identification engine 162 may perform operations in conjunction with query activity engine 164 to determine whether the correction pair 128A is an actual correction pair based on query activity (e.g., accessible via query activity database 164A). For example, again assume that the correction pair 128A includes a portion of a predicted textual segment corresponding to "covet" that was subsequently modified to an alternate textual segment of "COVID" (e.g., a correction pair of [covet, COVID]). In this example, further assume that several thousand queries including the alternate textual segment of "COVID" have been received within a threshold duration of time, and that these queries are indicative of a query spike for queries including "COVID". Accordingly, in this example, the correction identification engine 162 may utilize query spikes detected by the query activity engine 164 to determine that the alternate textual segment of "COVID" may be a newly introduced term to a population of users of the client devices that provided the correction pair of [covet, COVID] to the remote system 160. In various implementations, any client devices (e.g., the client device 110 and/or one or more of the additional client devices 180) may transmit any corresponding candidate correction pairs determined based on queries submitted at the respective client devices for inclusion in the subset.

In various implementations, and assuming that the correction identification engine 162 determines that the correction pair 128A does, in fact, correspond to an actual correction pair, client device identification engine 166 may identify a subset of client devices that provided an occurrence of the correction pair 128A. For example, the client device identification engine 166 may access the correction pair database 162A to identify any client devices (if any) that previously provided the correction pair 128A for inclusion in the subset. Notably, the client device identification engine 166 may make this identification as one or more client devices check in with the remote system 160 for training in a decentralized manner and in a periodic manner (e.g., once a day, once a week, etc.). The subset of client devices that provide an occurrence of the correction pair 128A may be utilized by the remote system 160 in causing a global ASR model 168A that is a remote-based counterpart of the on-device ASR model 122A (and corresponding on-device ASR models of one or more of the additional client devices 180). A remote training engine 168 may transmit an indication to each of the client devices of the subset to cause each of the client devices to generate an update for the global ASR model 168A and with respect to the correction pair 128A. For example, further assume that the client device 110 is identified for inclusion in the subset based on providing an instance of the correction pair 128A, and that the remote system 160 determines that the correction pair 128A corresponds to an actual correction pair. As a result, the remote training engine 168 may generate and transmit an indication to the client device 110 that causes the client device 110 to generate an update for the global ASR model 168A and with respect to the correction pair 128A.

At the client device 110, an update engine 130 may receive the indication to generate an update for the global ASR model 168A and with respect to the correction pair 128A. The update engine 130 may obtain, from the on-device storage 111 of the client device 110, at least a portion of the correction pair 128A and the audio data 110A that was processed locally at the client device to generate the portion of the one or more textual segments that is included in the correction pair 128A. Further, the update engine 130 may again process, using the on-device ASR model 122A, the audio data 110A, and may generate an update 130A based on the processing of the audio data 110A. Moreover, the update engine 130 may cause the update 120A to be transmitted to the remote system 160 for utilization by the remote training engine 168 in updating the global ASR model 168A. One or more of the additional client devices 180 that were also identified for inclusion in the subset may generate corresponding updates 180B in the same or similar manner, and may transmit the corresponding updates 180B to the remote system 160 for utilization by the remote training engine 168 in updating the global ASR model 168A.

In some implementations, and in generating the update 130A, the update engine 130 may process, using the on-device ASR model 122A, the audio data 110A to generate one or more additional predicted textual segments in the same or similar manner described above (e.g., with respect to the on-device ASR engine 122). However, rather than causing the one or more additional predicted textual segments to be at least visually rendered for presentation to the user of the client device (e.g., via the rendering engine 124 and as described with respect to the one or more predicted textual segments), the update engine 130 may compare a portion of the one or more additional predicted textual segments generated based on the subsequent processing of the audio data 110A to the one or more alternate textual segments of the correction pair 128A to generate a gradient using, for example, a supervised learning technique. In some versions of those implementations, the gradient may correspond to the update 130A that is transmitted to the remote system 160. In additional or alternative versions of those implementations, the update engine 130 may update the on-device ASR model locally at the client device 110 and based on the gradient, and may utilize one or more updated on-device weights of the updated on-device ASR model 122A as the update 130A.

In additional or alternative implementations, and in generating the update 130A, the update engine 130 may process, using a subset of machine learning (ML) layers of the on-device ASR model 122A, the audio data 110A to generate a representation of the audio data 110A, and may perform various forward and/or backward passes across the subset of ML layers of the on-device ASR model 122A. The ML layers of the on-device ASR model 122A may include, for example, one or more input layers, one or more joint layers, one or more encoding layers, one or more joint layers, one or more output layers, and/or other layers. Accordingly, in processing the audio data using the subset of ML layers of the on-device ASR model 122A, the update engine 130 may only generate the representation across one or more of the input layers, or across the one or more input layers and across one or more of the joint layers or encoding layers without generating anything across the one or more of the decoding layers or output layers. In these implementations, the subset of the ML layers may be updated based on the processing while other layers are fixed (e.g., other ML layers of the on-device ASR model 122A that were not utilized in processing the audio data 110A), and the difference between the subset of the ML layers prior to being updated and subsequent to be updated ((or a difference in one or more on-device weights associated with the subset of the ML layers prior to being updated and subsequent to being updated)) may be utilized as the update 130A.

In various implementations, and in response to receiving the update 130A form the client device 110 and one or more corresponding updates 180A from one or more of the additional client devices 180, the remote training engine 162 may utilize these updates to update the global ASR model 168A with respect to the correction pair 128. In particular, one or more global weights of the global speech recognition model 168A are updated in updating the global ASR model 168A (e.g., using a backpropagation or other techniques for updating ML model(s)). Further, an update distribution engine 170 can, responsive to one or more conditions being satisfied, provide, to client device 110 and/or one or more of the additional client devices 180, one or more of the updated global weights of the updated global ASR model and/or the updated global ASR model, as indicated by 170A. The one or more conditions can include, for example, a threshold duration and/or quantity of updating of the global ASR model 168A since any updated weight(s) and/or an updated global ASR model was last distributed, a measured improvement to the updated global ASR model and/or passage of a threshold duration of time since any updated weight(s) and/or an updated global ASR model was last distributed, and/or other conditions. When one or more of the updated global weights of the updated global ASR model and/or the updated global ASR model are distributed to the client device 110, the client device 110 can replace the on-device ASR model 122A (or the on-device weight(s) thereof) with the updated global ASR model (or the updated global weight(s) thereof).

Figure 1B:
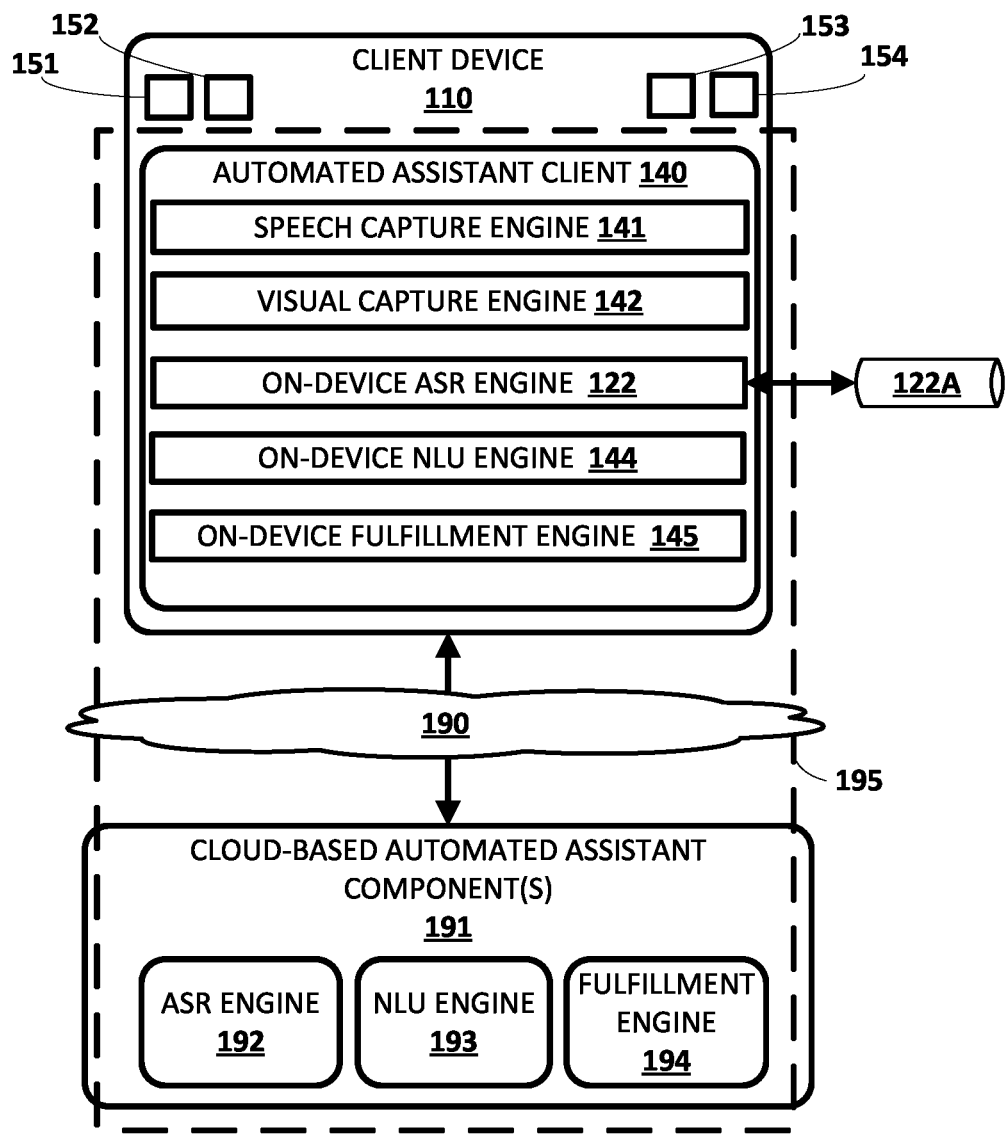
FIG. 1B depicts a block diagram of an example environment that includes various components from FIG. 1A, and in which implementations disclosed herein may be implemented.

Turning now to FIG. 1B, the client device 110 is illustrated in an implementation where the on-device ASR engine 122 of FIG. 1A is included as part of (or in communication with) an automated assistant client 140. The on-device ASR model 122A is also illustrated interfacing with the on-device ASR engine 122. Other components from FIG. 1A are not illustrated in FIG. 1B for simplicity. FIG. 1B illustrates one example of how the on-device ASR engine 122 and the on-device ASR model 122A can be utilized in generating predicted textual segments that are utilized by the automated assistant client 140 in performing various actions.

The client device 110 in FIG. 1B is illustrated with one or more microphones 151, one or more speakers 152, one or more camera(s) and/or other vision components 153, and display(s) 154 (e.g., a touch-sensitive display). The client device 110 at least selectively executes the automated assistant client 140. The automated assistant client 140 includes, in the example of FIG. 1B, the on-device ASR engine 122, an on-device natural language understanding (NLU) engine 144, and an on-device fulfillment engine 145. The automated assistant client 140 further includes speech capture engine 141 and visual capture engine 142. The automated assistant client 140 can include additional and/or alternative engines, such as a voice activity detector (VAD), an endpoint detector, a hotword detector, and/or other engine(s).

One or more cloud-based automated assistant components 191 can optionally be implemented on one or more computing systems (collectively referred to as a "cloud" computing system) that are communicatively coupled to client device 110 via one or more local and/or wide area networks (e.g., the Internet) indicated generally at 190. The cloud-based automated assistant components 191 can be implemented, for example, via a high-performance server or cluster of high-performance servers. In various implementations, an instance of the automated assistant client 140, and optionally by way of its interactions with one or more cloud-based automated assistant components 191, may form what appears to be, from a user's perspective, a logical instance of an automated assistant 195 with which the user may engage in a human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The vision component(s) 153 can take various forms, such as monographic cameras, stereographic cameras, a LIDAR component (or other laser-based component(s)), a radar component, etc. The one or more vision components 153 may be used, e.g., by visual capture engine 142, to capture vision frames (e.g., image frames, laser-based vision frames) of an environment in which client device 110 is deployed. In some implementations, such vision frame(s)

can be utilized to determine whether a user is present near the client device 110 and/or a distance of the user (e.g., the user's face) relative to the client device. Such determination(s) can be utilized, for example, in determining whether to activate the on-device ASR engine 122.

The speech capture engine 141 can be configured to capture user's speech and/or other audio data captured via microphone(s) 151. As described herein, such audio data can be utilized (optionally after pre-processing) by the on-device ASR engine 122. For example, the on-device ASR engine 122 can process audio data that captures a spoken utterance, utilizing the on-device ASR model 122A, to generate predicted textual segments that are predicted to correspond to the spoken utterance. The on-device NLU engine 144 performs on-device natural language understanding on the predicted textual segments to generate NLU data. The on-device NLU engine 144 can optionally utilize one or more on-device NLU models (not illustrated in FIG. 1B for simplicity) in generating the NLU data. The NLU data can include, for example, intent(s) that correspond to the spoken utterance and optionally parameter(s) (e.g., slot values) for the intent(s). Further, the on-device fulfillment engine 145 generates fulfillment data using the NLU data. The on-device fulfillment engine 145 can optionally utilize one or more on-device fulfillment models and/or rules (not illustrated in FIG. 1B for simplicity) in generating the fulfillment data. The fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

The display(s) 154 can be utilized to visually render streaming predicted textual segments that are generated based on predicted output from the on-device ASR engine 122. The display(s) 154 can further be one of the user interface output component(s) through which visual portion(s) of a response, from the automated assistant client 140, is rendered.

In some implementations, cloud-based automated assistant component(s) 191 can include a remote ASR engine 192 that performs speech recognition, a remote NLU engine 193 that performs natural language understanding, and/or a remote fulfillment engine 194 that generates fulfillment data. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, the one or more cloud-based automated assistant component(s) 191 can be utilized at least selectively. For example, such component(s) can be utilized in parallel with on-device component(s) and output from such component(s) utilized when local component(s) fail. For example, the on-device fulfillment engine 145 can fail in certain situations (e.g., due to relatively limited resources of client device 110) and the remote fulfillment engine 194 can utilize the more robust resources of the cloud to generate the fulfillment data in such situations. The remote fulfillment engine 194 can be operated in parallel with the on-device fulfillment engine 145 and its results utilized when on-device fulfillment fails, or can be invoked responsive to determining failure of the on-device fulfillment engine 145.

In various implementations, the NLU engine(s) 144 and/or 193 may generate annotated output that includes one or more annotations of the recognized text and one or more (e.g., all) of the terms of the natural language input. In some implementations the NLU engine(s) 144 and/or 193 may be configured to identify and annotate various types of grammatical information in natural language input. For example, the NLU engine(s) 144 and/or 193 may include a morphological module that may separate individual words into morphemes and/or annotate the morphemes, e.g., with their classes. The NLU engine(s) 144 and/or 193 may also include a part of speech tagger configured to annotate terms with their grammatical roles. Also, for example, in some implementations the NLU engine(s) 144 and/or 193 may additionally and/or alternatively include a dependency parser configured to determine syntactic relationships between terms in natural language input.

In some implementations, the NLU engine(s) 144 and/or 193 may additionally and/or alternatively include an entity tagger configured to annotate entity references in one or more segments such as references to people (including, for instance, literary characters, celebrities, public figures, etc.), organizations, locations (real and imaginary), and so forth. In some implementations, the NLU engine(s) 144 and/or 193 may additionally and/or alternatively include a coreference resolver (not depicted) configured to group, or "cluster," references to the same entity based on one or more contextual cues. In some implementations, one or more components of the NLU engine(s) 144 and/or 193 may rely on annotations from one or more other components of the NLU engine(s) 144 and/or 193.

In some implementations, the NLU engine(s) 144 and/or 193 may also include an intent matcher that is configured to determine an intent of a user engaged in an interaction with the automated assistant 195. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather I forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>"

example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

In some implementations, the fulfillment engine(s) 145 and/or may be configured to receive the predicted/estimated intent that is output by the NLU engine(s) 144 and/or 193, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment engine 145 can then initiate local and/or remote performance/execution of the determined action(s) to resolve the spoken utterance.

Figure 2:
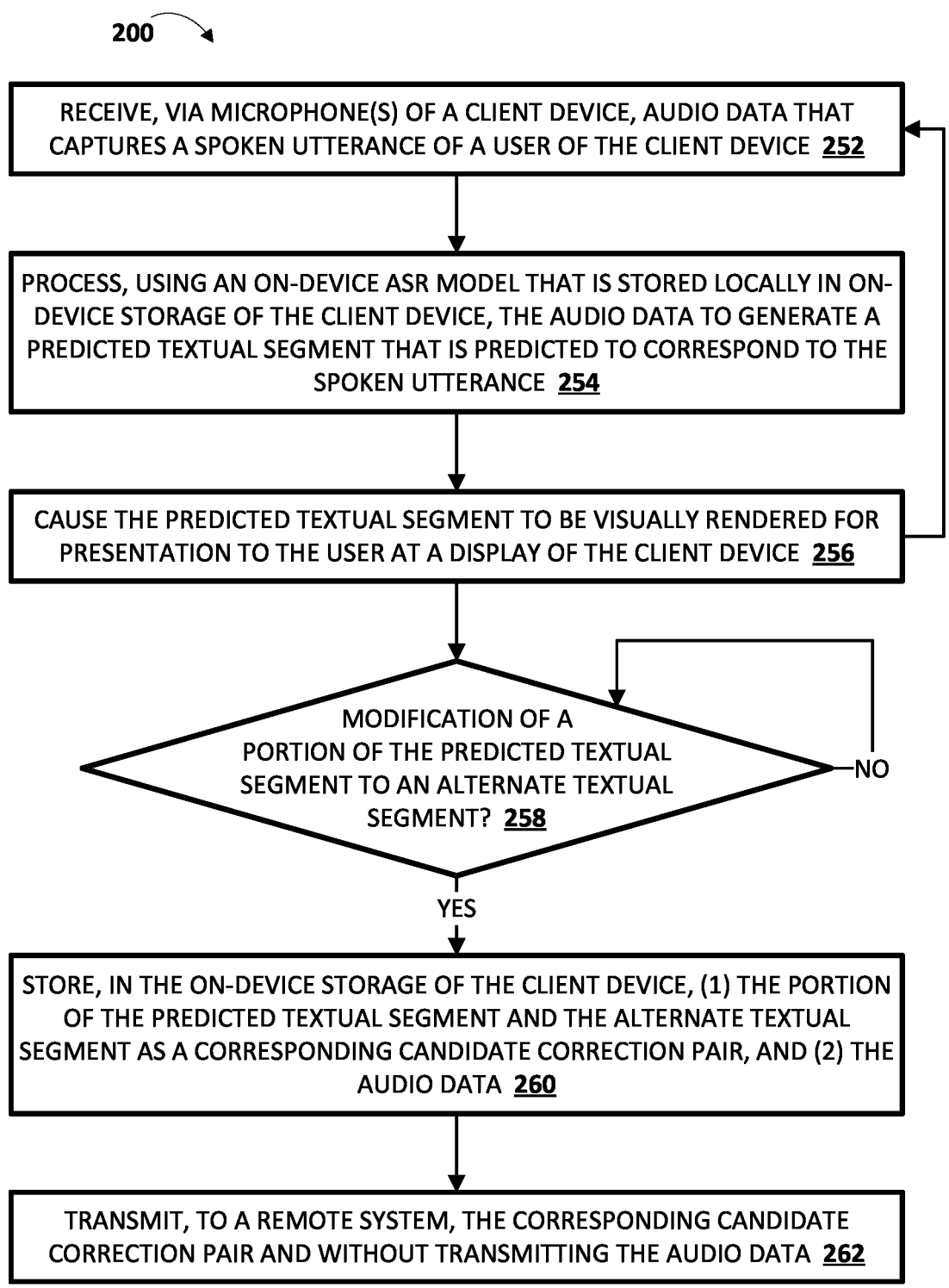
FIG. 2 depicts a flowchart illustrating an example method of identifying a corresponding candidate correction pair locally at a client device, in accordance with various implementations.

Turning now to FIG. 2, a flowchart illustrating an example method 200 of identifying a corresponding candidate correction pair locally at a client device is depicted. For convenience, the operations of the method 200 are described with reference to a system that performs the operations. The system of method 200 includes one or more processors and/or other component(s) of a client device (e.g., the client device 110 of FIGS. 1A and/or 1B, client device 610 of FIGS. 6A and/or 6B, computing device 710 of FIG. 7, and/or other client devices). Moreover, while operations of the method 200 are shown in a particular order, this is not meant to be limiting. One or more operations may be reordered, omitted, or added.

At block 252, the system receives, via one or more microphones of a client device, audio data that captures a spoken utterance of a user of the client device. At block 254, the system processes, using an on-device ASR model that is stored in on-device storage of the client device, the audio data to generate a predicted textual segment that is predicted to correspond to the spoken utterance. At block 256, the system causes the predicted textual segment to be visually rendered for presentation to the user at a display of the client device. The system may return to block 252 to continue receiving additional audio data, if any, continue processing, using the on-device ASR model, any additional audio data capturing any additional spoken utterances of the user, and continue causing any additional predicted textual segments to be visually rendered for presentation to the user at the display of the client devices in a streaming manner.

At block 258, the system determines whether further user interface input that includes a modification of a portion of the predicted textual segment to an alternate textual segment is received. In some implementations, the further user interface input may be typed or touch input directed to the portion of the predicted textual segment that is visually rendered at the display of the client device (e.g., as described with respect to FIGS. 6A and 6B). In additional or alternative implementations, the further user interface input may be an additional spoken utterance that includes a command for the system to modify the portion of the predicted textual segment to the alternate textual segment (e.g., determined using various components depicted in FIG. 1B). If, at an iteration of block 258, the system determines that no further user interface input that includes a modification of a portion of the predicted textual segment to an alternate textual segment is received, then the system may continue monitoring for further user interface input at block 258. Notably, the system may monitor for modifications to any textual segments that have been visually rendered for presentation to the user at block 258.

If, at an iteration of block 258, the system determines that further user interface input that includes a modification of a portion of the predicted textual segment to an alternate textual segment is received, then the system may proceed to block 260. At block 260, the system stores, in the on-device storage of the client device, (1) the portion of the predicted textual segment and the alternate textual segment as a corresponding candidate correction pair, and (2) the audio data. At block 262, the system transmits, to a remote system, the corresponding candidate correction pair and without transmitting the audio data. In transmitting the corresponding candidate correction pair to the remote system, the system may optionally employ one or more techniques to obfuscate the corresponding candidate correction pair due to privacy considerations. For instance, the system may tokenize the corresponding candidate correction pair in an opaque manner such that the corresponding candidate correction pair is interpretable by the remote system, but not any users that are associated with the remote system. In some implementations, the system may only transmit the corresponding candidate correction pair to the remote system in response to a threshold quantity of occurrences of the candidate correction pair being detected at the client device. In additional or alternative implementations, the system may only transmit the corresponding candidate correction pair to the remote system in response to the candidate correction pair being included on a list of candidate correction pairs that is received from the remote system and that includes candidate correction pairs that have been detected at other client devices.

Figure 3:
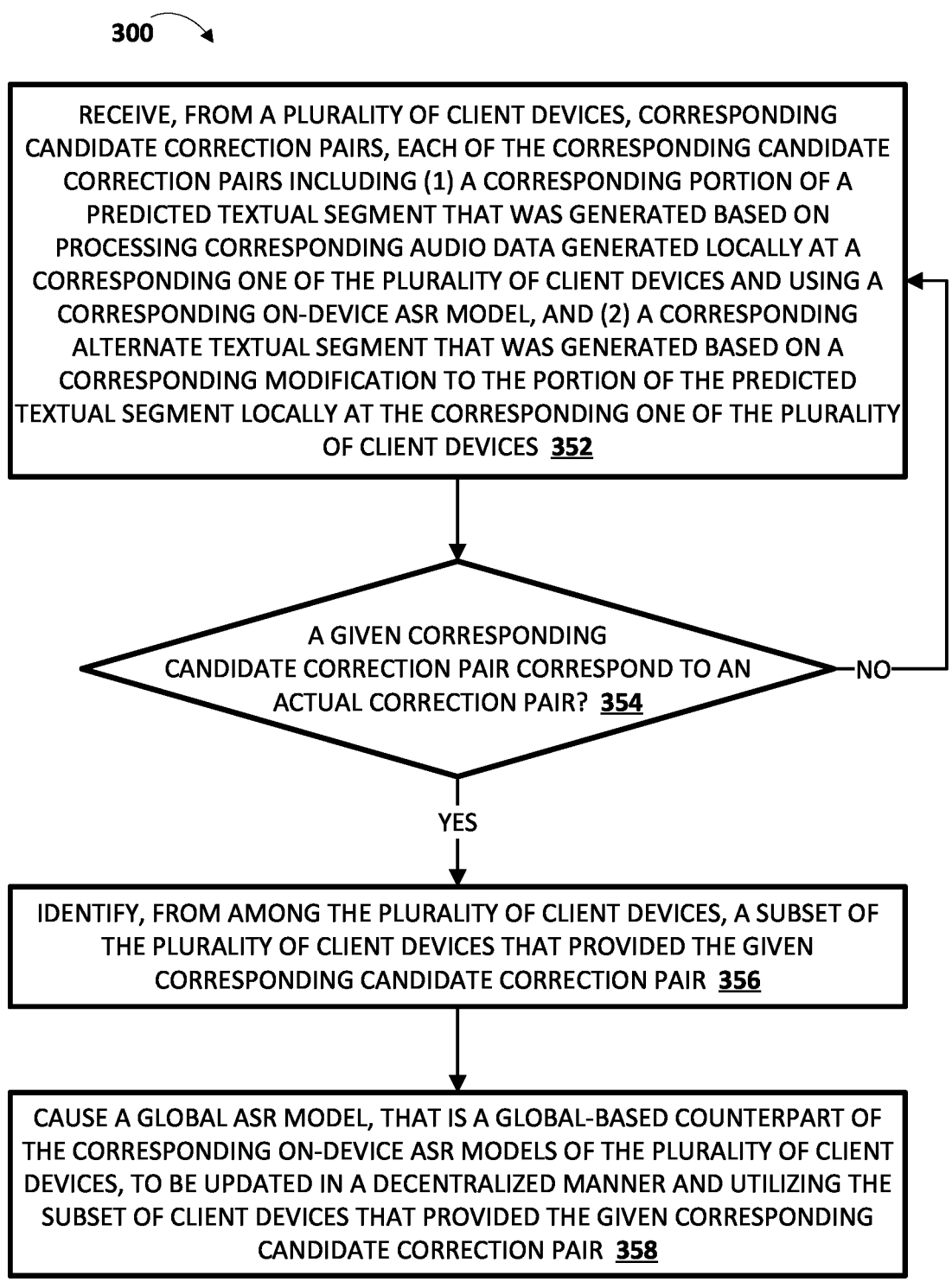
FIG. 3 depicts a flowchart illustrating an example method of determining whether a given corresponding candidate correction pair corresponds to an actual correction pair remotely at a remote system and causing a global automatic speech recognition (ASR) model to be updated based on determining that the given corresponding candidate correction pair corresponds to an actual correction pair, in accordance with various implementations.

Turning now to FIG. 3, a flowchart illustrating an example method 300 of determining whether a given corresponding candidate correction pair corresponds to an actual correction pair remotely at a remote system and causing a global automatic speech recognition (ASR) model to be updated based on determining that the given corresponding candidate correction pair corresponds to an actual correction pair is depicted. For convenience, the operations of the method 300 are described with reference to a system that performs the operations. The system of method 300 includes one or more processors and/or other component(s) of a remote system (e.g., the remote system 160 of FIG. 1A, the cloud-based automated assistant component(s) 191 of FIG. 1B, computing device 710 of FIG. 7, one or more high performance servers, and/or other computing devices). Moreover, while operations of the method 300 are shown in a particular order, this is not meant to be limiting. One or more operations may be reordered, omitted, or added.

At block 352, the system receives, from a plurality of client devices, corresponding candidate correction pairs, each of the corresponding candidate correction pairs including (1) a corresponding portion of a predicted textual segment that was generated based on processing corresponding audio data generated locally at a corresponding one of the plurality of client devices and using a corresponding on-device ASR model, and (2) a corresponding alternate textual segment that was generated based on a corresponding modification to the portion of the predicted textual segment locally at the corresponding one of the plurality of client devices. Further, the system may store the corresponding candidate correction pairs received from the plurality of client devices in one or more remote storage devices that are accessible by the system. The system may index the corresponding candidate correction pairs, and identify client devices that previously provided the corresponding candidate correction pair.

At block 354, the system determines whether a given corresponding candidate correction pair corresponds to an actual correction pair (e.g., as described with respect to the correction identification engine 162 of FIG. 1A). In some implementations, the system may determine whether the given corresponding candidate correction pair corresponds to an actual correction pair based on whether a threshold quantity of occurrences of the given corresponding candidate correction pair have been received from the plurality of client devices. In additional or alternative implementations, the system may determine whether the given corresponding candidate correction pair corresponds to an actual correction pair based on query activity associated with the plurality of client devices. In some versions of these implementations, the query activity at a given client device, of the plurality of client devices, may be utilized in determining whether the given corresponding candidate correction pair corresponds to an actual correction pair even if the given client device did not provide an occurrence of the given corresponding candidate correction pair to the system. In some implementations, and in response to determining that the given corresponding candidate correction pair corresponds to an actual correction pair, the system may utilize one or more techniques to verify that the given corresponding candidate correction pair does, in fact, correspond to an actual correction pair (e.g., based on an extent of acoustic similarity between the portion of the corresponding predicted textual segment and the alternate textual segment, based on a Levenshtein edit distance between the portion of the corresponding predicted textual segment and the alternate textual segment, and/or using other techniques).

If, at an iteration of block 354, the system determines that no given corresponding candidate correction pair corresponds to an actual correction pair, the system may return to block 352 and continue receiving corresponding candidate correction pairs from the plurality of client devices. If, at an iteration of block 354, the system determines that a given corresponding candidate correction pair corresponds to an actual correction pair, the system may proceed to block 356. At block 356, the system identifies, from among the plurality of client devices, a subset of the plurality of client devices that provided the given corresponding candidate correction pair (e.g., as described with respect to the client device identification engine 166 of FIG. 1).

At block 358, the system causes a global ASR model, that is a global-based counterpart of the corresponding on-device ASR models of the plurality of client devices, to be updated in a decentralized manner and utilizing the subset of client devices that provided the given corresponding candidate correction. Put another way, the method 200 of FIG. 2 sets forth an example technique for generating corresponding candidate correction pairs. Further, the method 300 of FIG. 3 sets forth an example technique for determining whether a given corresponding candidate correction pair does, in fact, correspond to an actual correction pair that is indicative of an ASR misrecognition across a population of client devices, rather than just considering corresponding candidate correction pairs generated at a single client device.

Figure 4:
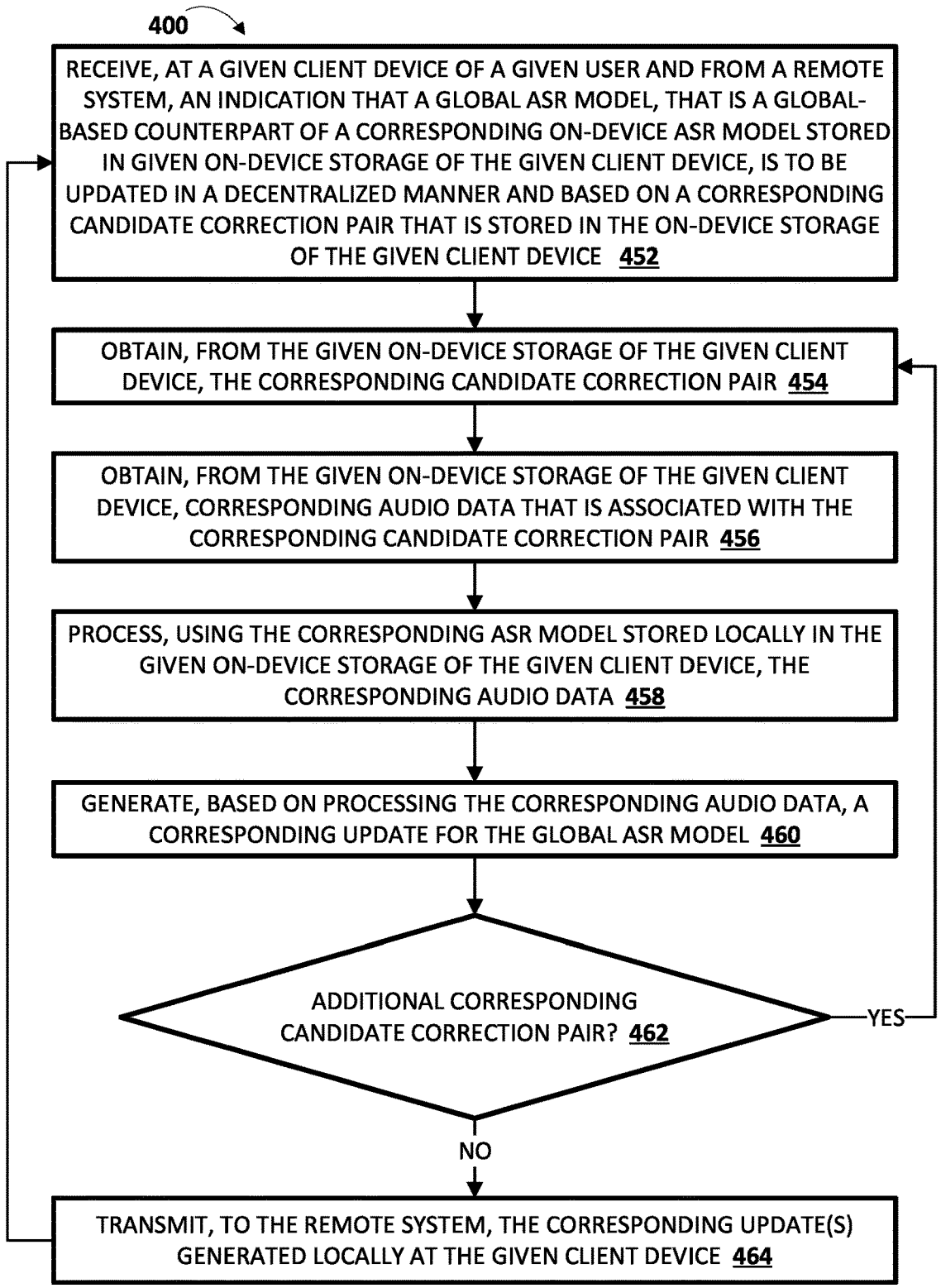
FIG. 4 depicts a flowchart illustrating an example method of generating a corresponding update for a global automatic speech recognition (ASR) model locally at a client device, in accordance with various implementations.

Turning now to FIG. 4, a flowchart illustrating an example method 400 of generating a corresponding update for a global automatic speech recognition (ASR) model locally at a client device is depicted. For convenience, the operations of the method 400 are described with reference to a system that performs the operations. The system of method 400 includes one or more processors and/or other component(s) of a client device (e.g., the client device 110 of FIGS. 1A and/or 1B, client device 610 of FIGS. 6A and/or 6B, computing device 710 of FIG. 7, and/or other client devices). Moreover, while operations of the method 400 are shown in a particular order, this is not meant to be limiting. One or more operations may be reordered, omitted, or added.

At block 452, the system receives, at a given client device of a given user and from a remote system, an indication that a global ASR model, that is a global-based counterpart of a corresponding on-device ASR model stored in given on-device storage of the given client device, is to be updated in a decentralized manner and based on a corresponding candidate correction pair that is stored in the on-device storage of the given client device. At block 454, the system obtains, from the given on-device storage of the given client device, at least a portion of the corresponding candidate correction pair (e.g., the alternate textual segment(s)). At block 456, the system obtains, from the given on-device storage of the given client device, corresponding audio data that is stored in association with the corresponding candidate correction pair.

At block 458, the system processes, using the corresponding on-device ASR model stored locally in the given on-device storage of the given client device, the corresponding audio data that is associated with the corresponding candidate correction pair. At block 460, the system generates, based on processing the corresponding audio data, a corresponding update for the global ASR model (e.g., as described with respect to the update engine 130 of FIG. 1A).

At block 462, the system determines whether an additional corresponding candidate correction pair is stored in the given on-device storage of the given client device. If, at an iteration of block 462, the system determines that an additional corresponding candidate correction pair is stored in the given on-device storage of the given client device, then the system may return to block 454 and generate an additional corresponding update with respect to the additional corresponding candidate correction pair. Put another way, the system may generate a corresponding update for each instance of the corresponding correction that is stored locally in the given on-device storage of the given client device. If, at an iteration of block 462, the system determines that no additional corresponding candidate correction pair is stored in the given on-device storage of the given client device, then the system may proceed to block 464.

At block 464, the system transmits, to the remote system, the one or more corresponding updates generated locally at the given client device. Put another way, the method 200 of FIG. 2 sets forth an example technique for generating corresponding candidate correction pairs. Further, the method 300 of FIG. 3 sets forth an example technique for determining whether a given corresponding candidate correction pair does, in fact, correspond to an actual correction pair that is indicative of an ASR misrecognition across a population of client devices, rather than just considering corresponding candidate correction pairs generated at a single client device. Moreover, the method 400 of FIG. 4 sets forth an example method of a given client device that provided the given corresponding candidate correction pair to the system generating a corresponding update with respect to the given corresponding candidate correction pair.

Figure 5:
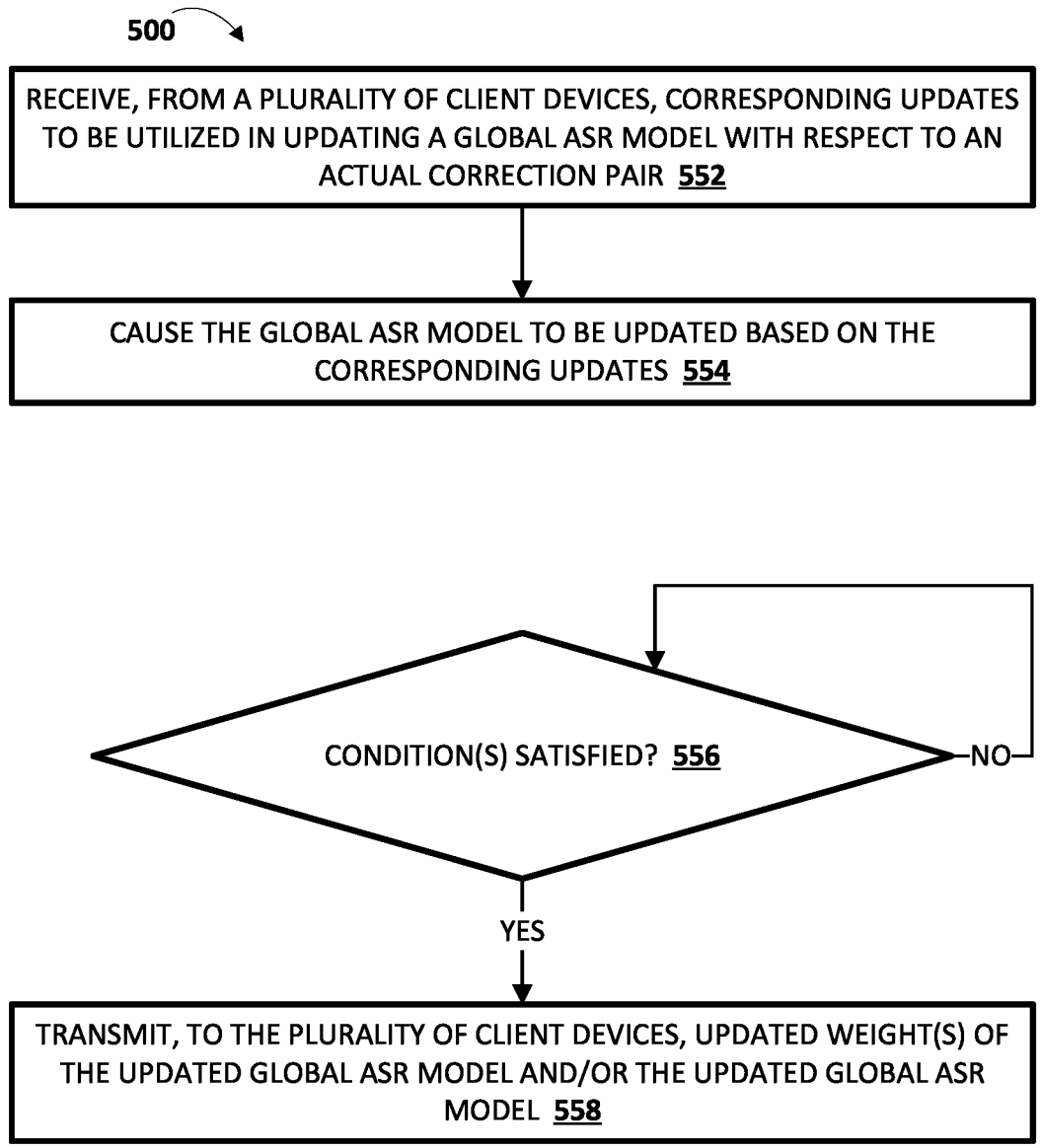
FIG. 5 depicts a flowchart illustrating an example method of updating a global automatic speech recognition (ASR) model remotely at a remote system, in accordance with various implementations.

Turning now to FIG. 5, a flowchart illustrating an example method 500 of updating a global automatic speech recognition (ASR) model remotely at a remote system is depicted. For convenience, the operations of the method 500 are described with reference to a system that performs the operations. The system of method 500 includes one or more processors and/or other component(s) of a remote system (e.g., the remote system 160 of FIG. 1A, the cloud-based automated assistant component(s) 191 of FIG. 1B, computing device 710 of FIG. 7, one or more high performance servers, and/or other computing devices). Moreover, while operations of the method 500 are shown in a particular order, this is not meant to be limiting. One or more operations may be reordered, omitted, or added.

At block 552, the system receives, from a plurality of client devices, corresponding updates to be utilized in updating a global ASR model with respect to an actual correction pair. At block 554, the system causes the global ASR model to be updated based on the corresponding updates (e.g., as described with respect to the remote training engine 168 of FIG. 1A). In some implementations, the system may wait until the corresponding updates are received from each of the plurality of client devices (e.g., that were identified for inclusion in the subset at block 456 of the method 300 of FIG. 3) prior to causing the global ASR model to be updated based on the corresponding updates. In additional or alternative implementations, the system may cause the global ASR model to be updated based on the corresponding updates as they are received from the plurality of client devices.

At block 556, the system determines whether one or more conditions are satisfied. If, at an iteration of block 556, the system determines that the one or more conditions are not satisfied, then the system may continue to monitor for satisfaction of the one or more conditions at block 556. Notably, the system may continue to update the global ASR model while monitoring for satisfaction of the one or more conditions at block 556. If, at an iteration of block 556, the system determines that the one or more conditions are satisfied, then the system may proceed to block 558. At block 558, the system transmits, to the plurality of client devices, one or more updated weights of the updated global ASR model and/or the updated global ASR model.

In some implementations, the one or more conditions may be specific to the global ASR model and/or the remote system. In these implementations, the one or more conditions may include, for example, whether the global ASR model has been updated based on a threshold quantity of corresponding updates, whether the global ASR model has been updated for a threshold duration of time, whether a threshold duration of time has lapsed since any updated global ASR model was last distributed, whether there is a measured improvement to the updated global ASR model, and/or other conditions. In additional or alternative implementations, the one or more conditions may be specific to each of the plurality of client devices that are to receive the one or more updated weights of the updated global ASR model and/or the updated global ASR model. In these implementations, the one or more conditions may include, for example, whether a given client device (e.g., of the plurality of client devices) is charging and/or has a threshold state of charge, whether the given client device is being held or utilized by a given user of the given client device, whether a given time associated with a given location of the given client device (e.g., determined using location sensor(s) of the given client device) is within a particular range of times, and/or other conditions.

Put another way, the method 200 of FIG. 2 sets forth an example technique for generating corresponding candidate correction pairs. Further, the method 300 of FIG. 3 sets forth an example technique for determining whether a given corresponding candidate correction pair does, in fact, correspond to an actual correction pair that is indicative of an ASR misrecognition across a population of client devices, rather than just considering corresponding candidate correction pairs generated at a single client device. Moreover, the method 400 of FIG. 4 sets forth an example method of a given client device that provided the given corresponding candidate correction pair to the system generating a corresponding update with respect to the given corresponding candidate correction pair. Additionally, the method 500 of FIG. 5 sets forth an example method of updating and distributing the global ASR model to obviate and/or mitigate future occurrences of the ASR misrecognition characterized by the given corresponding candidate correction pair.

Figure 6A:
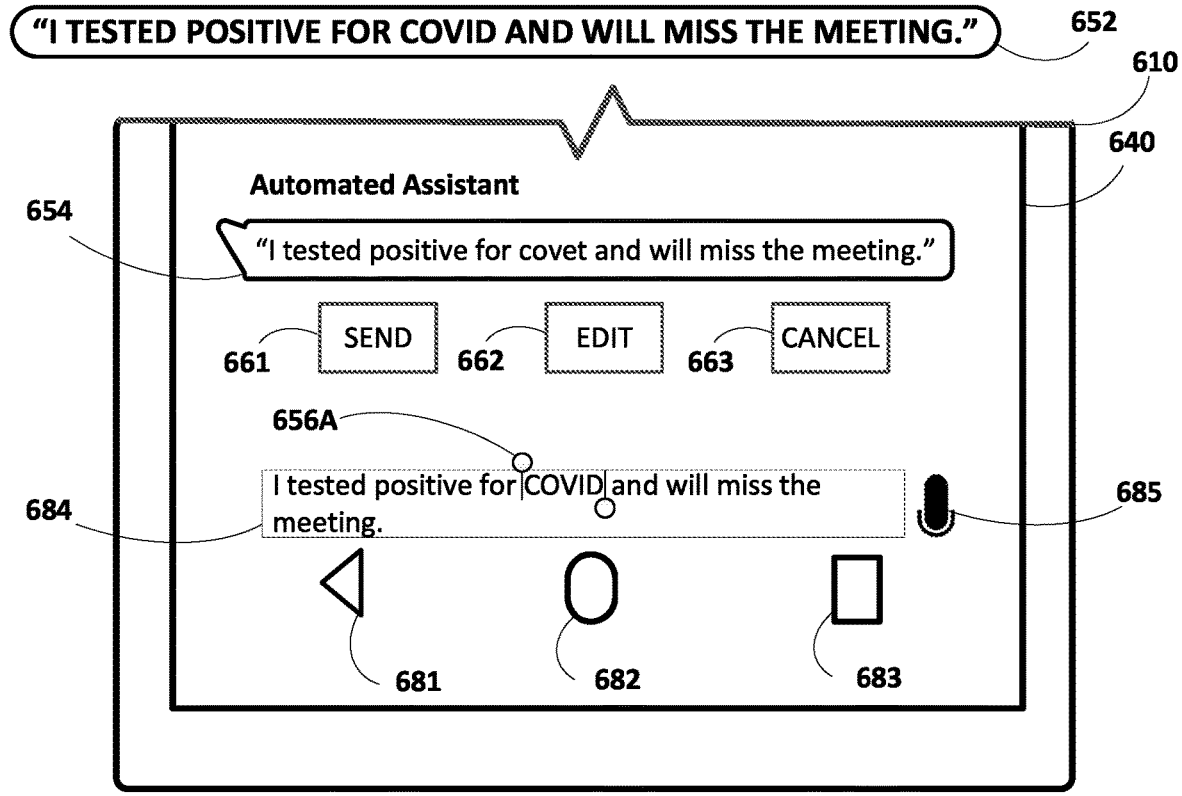
FIG. 6A and FIG. 6B depict various user interfaces illustrating example user interactions with a client device, in accordance with various implementations.
Figure 6B:
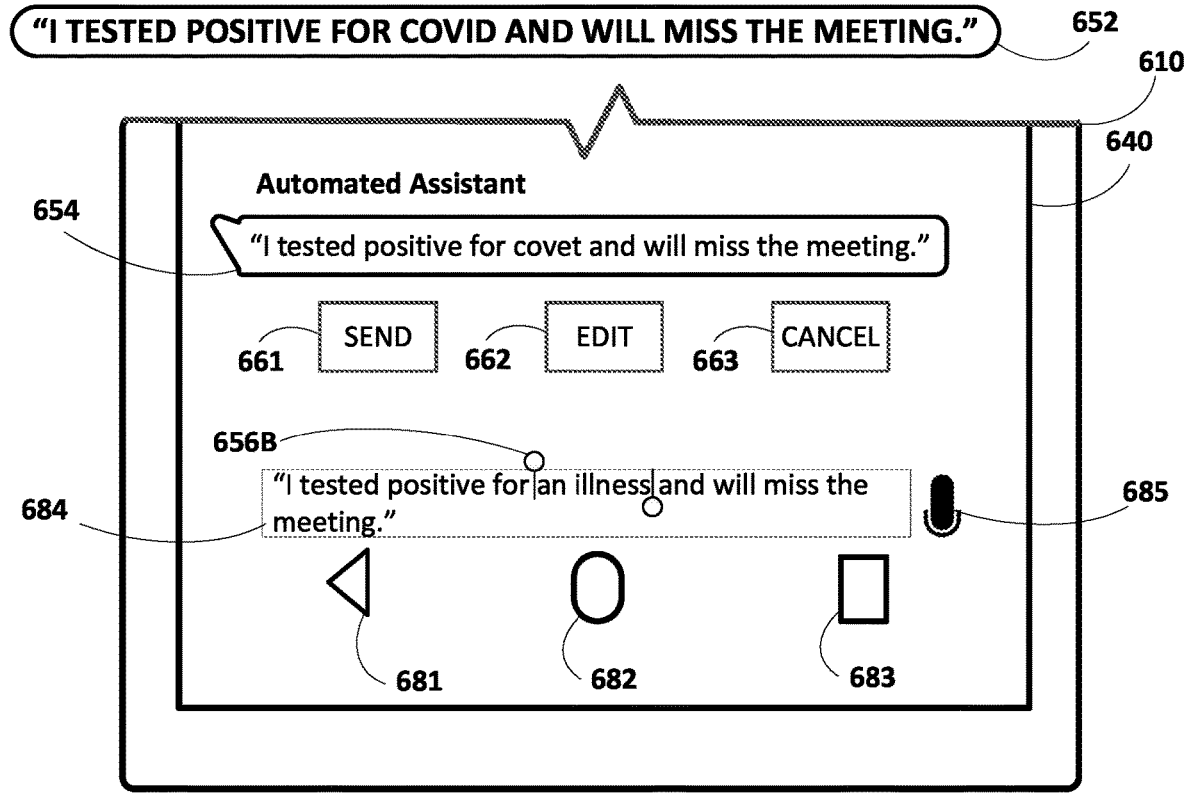

Turning now to FIGS. 6A and 6B, various user interfaces illustrating example user interactions with a client device 610 (e.g., an instance of the client device 110 from FIGS. 1A and 1B) are depicted. The client device 610 of FIGS. 6A and 6B includes a touch-sensitive display screen 640 that displays and/or streams (i.e., in real-time) predicted textual segments corresponding to spoken utterances provided by a user of the client device 610 according to implementations disclosed herein. For convenience, operations performed by the client device 610 are described with reference to an automated assistant (e.g., the automated assistant 195 of FIG. 1B) that performs the operations.

The display screen 640 includes a textual reply and/or editing element 684 that allows a user to provide user input (e.g., touch input or typed input) for generating, modifying, deleting, and/or replacing term(s) via a virtual keyboard. Further, the display screen 640 also includes a voice interface element 685 that, when activated, allows the user to provide user input (e.g., spoken input) for affirming an action being performed by the client device 610, canceling an action being performed by the client device 610, and/or providing the spoken utterance or additional spoken utterances via one or more microphones. In some implementations, audio data corresponding to a spoken utterance can be captured via one or more of the microphones, a predicted textual segment can be generated and visually rendered on the display screen 640 of the client device 610, and user input correcting the predicted textual segment to an alternate textual segment can be touch input directed to the predicted textual segment(s) included in the textual reply and/or editing element 684 of the display screen 640 of the client device 510. In additional and/or alternative implementations, the user input correcting the predicted textual segment to the alternate textual segment can be spoken input. In some versions of these implementations, the spoken input is received in response touch input directed to the voice interface element 685, the spoken input is received within a threshold amount of time of the user input while the one or more microphones are activated without any touch input directed to the voice interface element 685, and/or other spoken input activation methods. Moreover, in some implementations, the display screen 640 also includes system interface elements 681, 682, 683 that may be interacted with by the user to cause the computing device 610 to perform one or more actions.

Moreover, in some implementations, a spoken utterance may include an action to be performed by the automated assistant using the client device 610. As some non-limiting examples, the action may be an action of calling or dialing a phone number, sending a text or SMS message (e.g., as shown in FIGS. 6A and 6B), sending an email, looking up contact information, requesting navigational information, sending a calendar invitation, controlling one or more IoT devices, and/or other actions capable of being performed by the automated assistant operating on the client device 610.

Referring specifically to FIG. 6A, assume that a user of the client device 610 provides a spoken utterance 652 of "I tested positive for COVID and will miss the meeting tomorrow", and an automated assistant visually renders a predicted textual segment 654 of "I tested positive for covet and will miss the meeting tomorrow" (e.g., generated using the on-device ASR engine 122 of FIGS. 1A and 1B). Notably, the predicted textual segment 654 includes an ASR misrecognition—"covet" instead of "COVID" as the user intended. Accordingly, assume that the user directs further user interface input, such as touch input, to the client device 610 that modifies a portion of the predicted textual segment 654 (e.g., "covet") to an alternate textual segment (e.g., "COVID") as indicated by 656A, thereby resulting in "I tested positive for COVID and will miss the meeting tomorrow" as the user intended. In this example, the automated assistant may generate a corresponding candidate correction pair of [covet, COVID] based on the further user interface input that modifies the portion of the predicted textual segment 654 (e.g., "covet") to the alternate textual segment (e.g., "COVID") as indicated by 656A. Further, the automated assistant may cause the candidate correction pair of [covet, COVID] to be stored in on-device memory of the client device 610 and optionally in association with audio data that captures the spoken utterance 652. Moreover, the automated assistant may transmit the corresponding candidate correction pair to a remote system (e.g., the remote system 160 of FIG. 1A) without transmitting any of the audio data that captures the spoken utterance 652. This enables the remote system to determine whether the corresponding candidate correction pair corresponds to an actual correction pair, and, assuming that the remote system determines that the corresponding candidate correction pair of [covet, COVID] corresponds to an actual correction pair (e.g., as described with respect to the correction identification engine 162 of FIG. 1A), cause the client device 610 to generate a corresponding update that may be utilized in updating a global ASR model.

In some implementations, the client device 610 may only transmit the corresponding candidate correction pair of [covet, COVID] to the remote system in response to a threshold quantity of occurrences of the candidate correction pair of [covet, COVID] being detected at the client device 610. In additional or alternative implementations, the client device 610 may only transmit the corresponding candidate correction pair of [covet, COVID] to the remote system in response to the candidate correction pair of [covet, COVID] being included on a list of candidate correction pairs that is received from the remote system and that includes the candidate correction pair of [covet, COVID] being detected at other client devices.

In some implementations, the textual reply and/or editing element 684 can be automatically populated with the predicted textual segment 654 of "I tested positive for covet and will miss the meeting tomorrow" for editing by the user, and the user input can be directed to the textual reply and/or editing element 684 to, for example, modify "covet" to "COVID" as also indicated by 656A (e.g., cursor identifiers). In additional or alternative implementations, the automated assistant can visually render a send selectable graphical element 661, an edit selectable graphical element 662, and/or a cancel selectable graphical element 663. In some versions of those implementations, to populate the textual reply and/or editing element 684 with the predicted textual segment 654 of "I tested positive for covet and will miss the meeting tomorrow" for editing by the user, some user input can be directed to the edit selectable graphical element 662, thereby populating the textual reply and/or editing element 684.

Notably, the modification of the portion of the predicted textual segment 654 from "covet" to "COVID" may only be utilized in generating a corresponding update for the global ASR model in response to the remote system determining that the modification is, in fact, a correction that is directed to performance of the on-device ASR model of the client device 610. Further, the modification identified in FIG. 6A is directed to performance of the on-device ASR model (e.g., the on-device ASR model 122A of FIGS. 1A and 1B). Determining that the modification is a correction directed to performance of the on-device ASR model may be based on, for example, a threshold quantity of occurrences of a given corresponding correction pair (e.g., the corresponding correction pair of [covet, COVID]) being received at the remote system and from a population of client devices (e.g., the client device 610 and other client devices) and/or a spike in query activity across the population of client devices that is associated with the alternate textual segment 656A (e.g. a query spike associated with "COVID" in the example of FIG. 6A). Further, verifying that the modification is a correction directed to performance of the on-device ASR model may be based on, for example, similarity between the portion (e.g., "covet") of the predicted textual segment 654 and the alternate textual segment 656A (e.g., "COVID") that may be determined based on acoustic similarity, Levenshtein edit distance, and/or using other techniques.

In contrast, and referring specifically to FIG. 6B, assume that instead the user had directed further user interface input, such as touch input, to the client device 610 that modifies a portion of the predicted textual segment 654 (e.g., "covet") to an alternate textual segment (e.g., "an illness") as indicated by 656B, thereby resulting in "I tested positive for an illness and will miss the meeting tomorrow". Notably, in this example, the user of the client device 610 has simply changed their mind with respect to the spoken utterance 652 (e.g., by changing "COVID" to "an illness") despite the ASR misrecognition. Nonetheless, the automated assistant may generate a corresponding candidate correction pair of [covet, an illness] based on the further user interface input that modifies the portion of the predicted textual segment 654 (e.g., "covet") to the alternate textual segment (e.g., "an illness") as indicated by 656B. Further, the automated assistant may cause the candidate correction pair of [covet, an illness] to be stored in on-device memory of the client device 610 and optionally in association with audio data that captures the spoken utterance 652. Moreover, the automated assistant may transmit the corresponding candidate correction pair to a remote system (e.g., the remote system 160 of FIG. 1A) without transmitting any of the audio data that captures the spoken utterance 652. This enables the remote system to determine whether the corresponding candidate correction pair corresponds to an actual correction pair, and, assuming that the remote system determines that the corresponding candidate correction pair of [covet, an illness] corresponds to an actual correction pair (e.g., as described with respect to the correction identification engine 162 of FIG. 1A), cause the client device 610 to generate a corresponding update that may be utilized in updating a global ASR model.

In some implementations, the client device 610 may only transmit the corresponding candidate correction pair of [covet, an illness] to the remote system in response to a threshold quantity of occurrences of the candidate correction pair of [covet, an illness] being detected at the client device 610. In additional or alternative implementations, the client device 610 may only transmit the corresponding candidate correction pair of [covet, an illness] to the remote system in response to the candidate correction pair of [covet, an illness] being included on a list of candidate correction pairs that is received from the remote system and that includes the candidate correction pair of [covet, an illness] being detected at other client devices.

However, in this example, it is unlikely that the remote system would determine that the candidate correction pair of [covet, an illness] corresponds to an actual correction pair based on, for example, a threshold quantity of occurrences of a given corresponding correction pair (e.g., the corresponding correction pair of [covet, an illness]) being received at the remote system and from a population of client devices (e.g., the client device 610 and other client devices) and/or a spike in query activity across the population of client devices that is associated with the alternate textual segment 656A (e.g. a query spike associated with "COVID" in the example of FIG. 6A). Put another way, since users often change their minds in different manners, it is unlikely that a threshold quantity of occurrences of the candidate correction pair of [covet, an illness] would be received by the remote system. And even in instances where a threshold quantity of occurrences of the candidate correction pair of [covet, an illness] are received by the remote system, it is unlikely that this modification would be verified as a correction directed to performance of the on-device ASR model based on, for example, a lack of similarity between the portion (e.g., "covet") of the predicted textual segment 654 and the alternate textual segment 656B (e.g., "an illness") due to a lack of acoustic similarity.

Although FIGS. 6A and 6B depict particular examples, it should be understood that these examples are provided for illustrative purposes and are not meant to be limiting. Rather, it should be understood that FIGS. 6A and 6B are provided to illustrate various user interactions in which corresponding candidate correction pairs may be generated locally at the client device 610.

Figure 7:
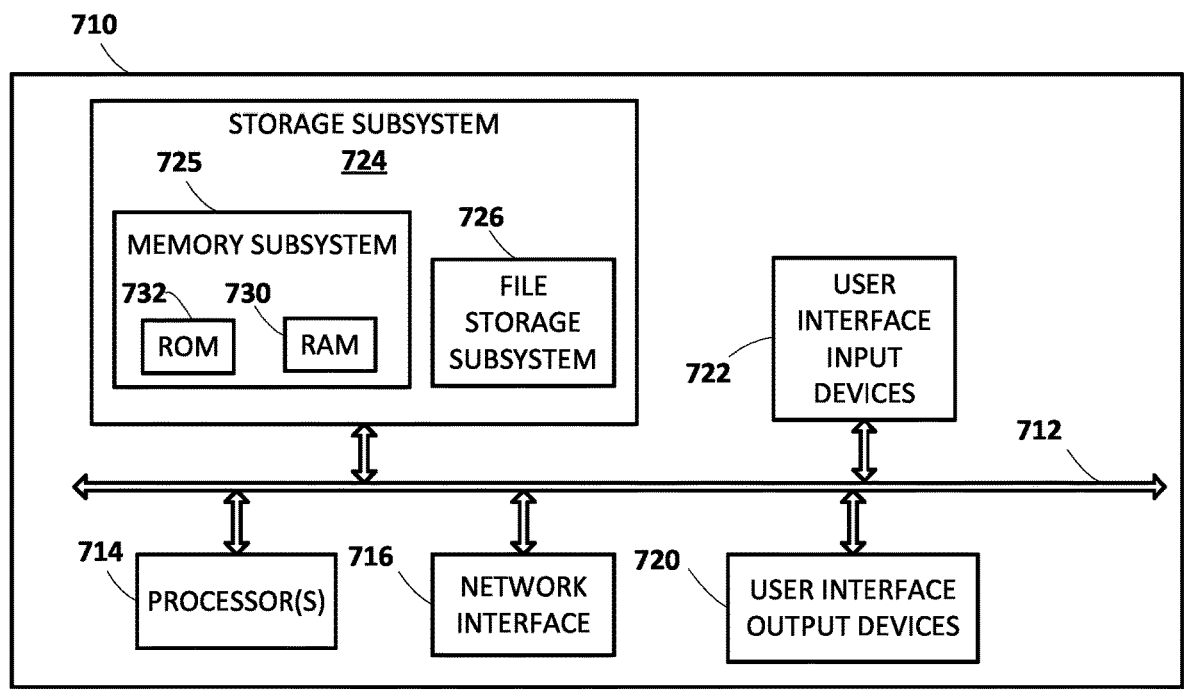
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1A and 13.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a remote system is provided herein, and includes receiving, from a plurality of client devices, corresponding candidate correction pairs. Each of the corresponding candidate correction pairs include: a corresponding portion of a corresponding predicted textual segment that was generated based on processing corresponding audio data locally at a corresponding one of the plurality of client devices and using a corresponding on-device automatic speech recognition (ASR) model, and a corresponding alternate textual segment that was generated locally at the corresponding one of the plurality of client devices and based on a corresponding modification to the corresponding portion of the corresponding predicted textual segment that resulted in the corresponding alternate textual segment. The method further includes determining whether a given corresponding candidate correction pair, of the corresponding candidate correction pairs, is a corresponding actual correction pair based a threshold quantity of occurrences on the given corresponding candidate correction pair being received from one or more of the plurality of client devices; and in response to determining that the given corresponding candidate correction pair is a corresponding actual correction pair: identifying, from among the plurality of client devices, a subset of the plurality of client devices that provided the given corresponding candidate correction pair; and causing a global ASR model, that is a global-based counterpart of the corresponding on-device ASR models, to be updated in a decentralized manner and utilizing the subset of the plurality of client devices.

These and other implementations of the technology can include one or more of the following features.

In some implementations, causing the global ASR model to be updated in the decentralized manner and utilizing the subset of the plurality of client devices that provided the given corresponding candidate correction pair may include transmitting, to each client device included in the subset of that plurality of client devices that provided the given corresponding candidate correction pair, a corresponding indication that the global ASR model is to be updated in the decentralized manner. Transmitting the corresponding indication that the global ASR model is to be updated in the decentralized manner to a given client device, that is included in the subset of the plurality of client devices, may cause the given client device to: obtain, from on-device storage of the given client device, the corresponding audio data that was previously processed to generate the corresponding predicted textual segment; generate, based on processing the corresponding audio data and using the corresponding on-device ASR model, a corresponding update for the global ASR model; and transmit, to the remote system, the corresponding update.

In some versions of those implementations, causing the given client device to generate the corresponding update based on processing the corresponding audio data and using the corresponding on-device ASR model may cause the given client device to: process, using the corresponding on-device ASR model that is stored locally in the on-device storage of the client device, the corresponding audio data to generate a corresponding additional predicted textual segment; and generate the corresponding update based on comparing at least a portion of the corresponding additional predicted textual segment and the corresponding alternate textual segment.

In some versions of those implementations, the corresponding on-device ASR model may include a plurality of layers, and the corresponding update may be generated for a subset of the plurality of layers of the corresponding on-device ASR model.

In some versions of those implementations, the method may further include receiving, from the given client device, the corresponding update; and updating the global ASR model based on the corresponding update received from the given client device and corresponding additional updates for the global ASR model received from one or more additional client devices, of the plurality of client devices, that are also included in the subset of the plurality of client devices.

In some further versions of those implementations, the method may further include transmitting, to the plurality of client devices, the updated global ASR model. Transmitting the updated global ASR model to the given client device may cause the given client device to: replace, in the on-device storage of the given client device, the corresponding on-device ASR model with the updated global ASR model.

In additional or alternative further versions of those implementations, the method may further include transmitting, to the plurality of client devices, one or more updated global weights of the updated global ASR model. Transmitting the one or more updated global weights of the updated global ASR model to the given client device may cause the given client device to: replace, in the on-device storage of the given client device, one or more on-device weights of the corresponding on-device ASR model with the one or more updated global weights of the updated global ASR model.

In additional or alternative further versions of those implementations, the updated global ASR model may bias subsequent speech processing towards the corresponding alternate textual segment.

In additional or alternative further versions of those implementations, the updated global ASR model may bias subsequent speech processing away from the portion of the corresponding predicted textual segment.

In some implementations, the method may further include, in response to determining that the given corresponding candidate correction pair is not a corresponding actual correction pair: refraining from causing the global ASR model to be updated in the decentralized manner and utilizing the one or more of the plurality of client devices that provided the given corresponding candidate correction pair.

In some implementations, the corresponding audio data that is processed locally at the corresponding one of the plurality of client devices and using the corresponding on-device ASR model may not be received at the remote system.

In some implementations, the corresponding audio data that is processed locally at the corresponding one of the plurality of client devices and using the corresponding on-device ASR model may be stored in on-device storage of the corresponding one of the plurality of client devices in response to the corresponding alternate textual segment being generated.

In some implementations, determining whether the given corresponding candidate correction pair is a corresponding actual correction pair may be further based on corresponding query activity at the plurality of client devices.

In some implementations, a method performed by one or more processors of a client device is provided herein, and includes receiving, via one or more microphones of a client device, audio data that captures a spoken utterance of a user of the client device; processing, using an on-device automatic speech recognition (ASR) model that is stored locally in on-device storage of the client device, the audio data to generate a predicted textual segment that is predicted to correspond to the spoken utterance; causing the predicted textual segment to be visually rendered for presentation to the user at a display of the client device; receiving, responsive to the predicted textual segment being visually rendered, further user interface input that modifies at least a portion of the predicted textual segment to an alternate textual segment; in response to receiving the further user interface input that modifies the portion of the predicted textual segment to the alternate textual segment: storing, in the on-device storage of the client device, the portion of predicted textual segment and the alternate textual segment as a corresponding candidate correction pair; transmitting, to a remote system, the corresponding candidate correction pair; and storing, in the on-device storage of the client device, the audio data that captures the spoken utterance of the user; receiving, from the remote system, an indication that a global ASR model, that is a global-based counterpart of the corresponding on-device ASR model, is to be updated in a decentralized manner and based on the corresponding correction pair; and in response to receiving the indication that the global ASR model is to be updated in the decentralized manner and based on the corresponding correction pair: generating, based on the corresponding candidate correction pair and based on the audio data, an update for the global ASR model to be utilized by the remote system in updating the global ASR model; and transmitting, to the remote system, the update to cause the update to be utilized in updating the global ASR model.

These and other implementations of the technology can include one or more of the following features.

In some implementations, the method may further include refraining from transmitting, to the remote system, the audio data that captures the spoken utterance of the user.

In some implementations, generating the update to be utilized by the remote system in updating the global ASR model based on the corresponding candidate correction pair and based on the audio data may include processing, using the on-device ASR model that is stored locally in the on-device storage of the client device, the audio data to generate an additional predicted textual segment that is predicted to correspond to the spoken utterance; and generating, based on comparing the additional predicted textual segment and the corresponding alternate textual segment, the update.

In some implementations, transmitting the update to the remote system may cause the remote system to: update the global ASR model based on the update provided by the client device and a plurality of additional corresponding updates provided by a plurality of additional client devices that provided additional instances of the corresponding candidate correction pair.

In some versions of those implementations, the method may further include receiving, from the remote system, the updated global ASR model; and replacing, in the on-device storage of the client device, the on-device ASR model with the updated global ASR model.

In some versions of those implementations, the method may further include receiving, from the remote system, one or more updated global weights of the updated global ASR model; and replacing, in the on-device storage of the client device, one or more on-device weights of the on-device ASR model with the one or more updated global weights of the updated global ASR model.

In some implementations, the indication that the global ASR model is to be updated in the decentralized manner and based on the corresponding correction pair may be received in response to the remote system determining that a threshold quantity of occurrences of the corresponding correction pair have been received from the client device and/or a plurality of additional client devices.

In some implementations, the further user interface input may be touch input of the user of the client device directed to the portion of the predicted textual segment that is being visually rendered for presentation to the user at the display of the client device.

In some implementations, the further user interface input may be an additional spoken utterance of the user that is directed to the portion of the predicted textual segment that is being visually rendered for presentation to the user at the display of the client device.

In some implementations, the on-device ASR model may include a plurality of layers, and the update may be generated for a subset of the plurality of layers of the on-device ASR model.

In some implementations, transmitting the corresponding candidate correction pair to the remote system may be in response to determining that a threshold quantity of occurrences of the corresponding candidate correction pair have been detected at the client device.

In some implementations, transmitting the corresponding candidate correction pair to the remote system may be in response to determining that the corresponding candidate correction pair is included in a list of candidate correction pairs that is received from the remote system.

In some implementations, a system of computing devices is provided, and includes a given client device of a given user, the given client device including at least one client device processor and client device memory storing instructions that, when executed by the at least one client device processor, cause the at least one client device processor to: receive, via one or more microphones of the given client device, audio data that captures a spoken utterance of the given user; process, using an on-device automatic speech recognition (ASR) model that is stored locally at the given client device, the audio data to generate a predicted textual segment that is predicted to correspond to the spoken utterance; cause the predicted textual segment to be visually rendered for presentation to the given user at a display of the given client device; receive, responsive to the predicted textual segment being visually rendered, further user interface input that modifies at least a portion of the predicted textual segment to an alternate textual segment; and in response to receiving the further user interface input that modifies the predicted textual segment to an alternate textual segment: cause the portion of the predicted textual segment and the alternate textual segment to be stored locally at the given client device as a corresponding candidate correction pair; and cause the audio data that captures the spoken utterance of the user to be stored locally at the given client device. The system of computing devices further includes a remote server communicatively coupled to the given client device, the remote server including at least one remote processor and remote memory storing instructions that, when executed by the at least one remote processor, cause the at least one remote processor to: receive, from the given client device, the corresponding candidate correction pair;

determine whether the corresponding candidate correction pair is a corresponding actual correction pair based on a threshold quantity of occurrences of the corresponding candidate correction pair being received from the given client device and/or a plurality of additional client devices that are in addition to the given client device; and in response to determining that the given corresponding candidate correction pair is a corresponding actual correction pair: cause a global ASR model, that is a global-based counterpart of the corresponding on-device ASR models, to be updated in a decentralized manner and utilizing the given client device and/or the plurality of additional client devices.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method implemented by one or more processors of a remote system, the method comprising:
receiving, from a plurality of client devices, corresponding candidate correction pairs, each of the corresponding candidate correction pairs including:
a corresponding portion of a corresponding predicted textual segment that was generated based on processing corresponding audio data locally at a corresponding one of the plurality of client devices and using a corresponding on-device automatic speech recognition (ASR) model, and
a corresponding alternate textual segment that was generated locally at the corresponding one of the plurality of client devices and based on a corresponding modification to the corresponding portion of the corresponding predicted textual segment that resulted in the corresponding alternate textual segment;
determining whether a given corresponding candidate correction pair, of the corresponding candidate correction pairs, is a corresponding actual correction pair based a threshold quantity of occurrences of the given corresponding candidate correction pair being received from one or more of the plurality of client devices; and
in response to determining that the given corresponding candidate correction pair is a corresponding actual correction pair:
identifying, from among the plurality of client devices that provided the given corresponding candidate correction pair, a subset of the plurality of client devices that provided the given corresponding candidate correction pair; and
causing a global ASR model, that is a global-based counterpart of the corresponding on-device ASR models, to be updated in a decentralized manner and utilizing the subset of the plurality of client devices that provided the given corresponding candidate correction pair.

2. The method of claim 1, wherein causing the global ASR model to be updated in the decentralized manner and utilizing the subset of the plurality of client devices that provided the given corresponding candidate correction pair comprises:
transmitting, to each client device included in the subset of that plurality of client devices that provided the given corresponding candidate correction pair, a corresponding indication that the global ASR model is to be updated in the decentralized manner, wherein transmitting the corresponding indication that the global ASR model is to be updated in the decentralized manner to a given client device, that is included in the subset of the plurality of client devices, causes the given client device to:
obtain, from on-device storage of the given client device, the corresponding audio data that was previously processed to generate the corresponding predicted textual segment;
generate, based on processing the corresponding audio data and using the corresponding on-device ASR model, a corresponding update for the global ASR model; and
transmit, to the remote system, the corresponding update.

3. The method of claim 2, wherein causing the given client device to generate the corresponding update based on processing the corresponding audio data and using the corresponding on-device ASR model causes the given client device to:
process, using the corresponding on-device ASR model that is stored locally in the on-device storage of the client device, the corresponding audio data to generate a corresponding additional predicted textual segment; and
generate the corresponding update based on comparing at least a portion of the corresponding additional predicted textual segment and the corresponding alternate textual segment.

4. The method of claim 2, wherein the corresponding on-device ASR model includes a plurality of layers, and wherein the corresponding update is generated for a subset of the plurality of layers of the corresponding on-device ASR model.

5. The method of claim 2, further comprising:
receiving, from the given client device, the corresponding update; and
updating the global ASR model based on the corresponding update received from the given client device and corresponding additional updates for the global ASR model received from one or more additional client devices, of the plurality of client devices, that are also included in the subset of the plurality of client devices.

6. The method of claim 5, further comprising:
transmitting, to the plurality of client devices, the updated global ASR model, wherein transmitting the updated global ASR model to the given client device causes the given client device to:
replace, in the on-device storage of the given client device, the corresponding on-device ASR model with the updated global ASR model.

7. The method of claim 5, further comprising:
transmitting, to the plurality of client devices, one or more updated global weights of the updated global ASR model, wherein transmitting the one or more updated global weights of the updated global ASR model to the given client device causes the given client device to:
　replace, in the on-device storage of the given client device, one or more on-device weights of the corresponding on-device ASR model with the one or more updated global weights of the updated global ASR model.

8. The method of claim 5, wherein the updated global ASR model biases subsequent speech processing towards the corresponding alternate textual segment.

9. The method of claim 5, wherein the updated global ASR model biases subsequent speech processing away from the portion of the corresponding predicted textual segment.

10. The method of claim 1, further comprising:
in response to determining that the given corresponding candidate correction pair is not a corresponding actual correction pair:
　refraining from causing the global ASR model to be updated in the decentralized manner and utilizing the one or more of the plurality of client devices that provided the given corresponding candidate correction pair.

11. The method of claim 1, wherein the corresponding audio data that is processed locally at the corresponding one of the plurality of client devices and using the corresponding on-device ASR model is not received at the remote system.

12. The method of claim 1, wherein the corresponding audio data that is processed locally at the corresponding one of the plurality of client devices and using the corresponding on-device ASR model is stored in on-device storage of the corresponding one of the plurality of client devices in response to the corresponding alternate textual segment being generated.

13. The method of claim 1, wherein determining whether the given corresponding candidate correction pair is a corresponding actual correction pair is further based on corresponding query activity at the plurality of client devices.

14. A method implemented by one or more processors of a client device, the method comprising:
receiving, via one or more microphones of a client device, audio data that captures a spoken utterance of a user of the client device;
processing, using an on-device automatic speech recognition (ASR) model that is stored locally in on-device storage of the client device, the audio data to generate a predicted textual segment that is predicted to correspond to the spoken utterance;
causing the predicted textual segment to be visually rendered for presentation to the user at a display of the client device;
receiving, responsive to the predicted textual segment being visually rendered, further user interface input that modifies at least a portion of the predicted textual segment to an alternate textual segment;
in response to receiving the further user interface input that modifies the portion of the predicted textual segment to the alternate textual segment:
　storing, in the on-device storage of the client device, the portion of predicted textual segment and the alternate textual segment as a corresponding candidate correction pair;
　transmitting, to a remote system, the corresponding candidate correction pair; and
　storing, in the on-device storage of the client device, the audio data that captures the spoken utterance of the user;
　receiving, from the remote system, an indication that a global ASR model, that is a global-based counterpart of the corresponding on-device ASR model, is to be updated in a decentralized manner and based on the corresponding candidate correction pair; and
in response to receiving the indication that the global ASR model is to be updated in the decentralized manner and based on the corresponding candidate correction pair:
　generating, based on the corresponding candidate correction pair and based on the audio data, an update for the global ASR model to be utilized by the remote system in updating the global ASR model; and
　transmitting, to the remote system, the update to cause the update to be utilized, along with one or more additional updates provided by the one or more additional client devices associated with the corresponding candidate correction pair, in updating the global ASR model.

15. The method of claim 14, further comprising:
refraining from transmitting, to the remote system, the audio data that captures the spoken utterance of the user.

16. The method of claim 14, wherein generating the update to be utilized by the remote system in updating the global ASR model based on the corresponding candidate correction pair and based on the audio data comprises:
processing, using the on-device ASR model that is stored locally in the on-device storage of the client device, the audio data to generate an additional predicted textual segment that is predicted to correspond to the spoken utterance; and
generating, based on comparing the additional predicted textual segment and the corresponding alternate textual segment, the update.

17. The method of claim 14, wherein transmitting the update to the remote system causes the remote system to:
update the global ASR model based on the update provided by the client device and a plurality of additional corresponding updates provided by a plurality of additional client devices that provided additional instances of the corresponding candidate correction pair.

18. The method of claim 14, wherein transmitting the corresponding candidate correction pair to the remote system is in response to determining that a threshold quantity of occurrences of the corresponding candidate correction pair have been detected at the client device.

19. The method of claim 14, wherein transmitting the corresponding candidate correction pair to the remote system is in response to determining that the corresponding candidate correction pair is included in a list of candidate correction pairs that is received from the remote system.

20. A system of computing devices, the system of computing devices comprising:
a given client device of a given user, the given client device including at least one client device processor and client device memory storing instructions that, when executed by the at least one client device processor, cause the at least one client device processor to:
　receive, via one or more microphones of the given client device, audio data that captures a spoken utterance of the given user;
　process, using an on-device automatic speech recognition (ASR) model that is stored locally at the given client device, the audio data to generate a predicted textual segment that is predicted to correspond to the spoken utterance;

cause the predicted textual segment to be visually rendered for presentation to the given user at a display of the given client device;

receive, responsive to the predicted textual segment being visually rendered, further user interface input that modifies at least a portion of the predicted textual segment to an alternate textual segment; and in response to receiving the further user interface input that modifies the predicted textual segment to an alternate textual segment:

cause the portion of the predicted textual segment and the alternate textual segment to be stored locally at the given client device as a corresponding candidate correction pair; and cause the audio data that captures the spoken utterance of the user to be stored locally at the given client device;

a remote server communicatively coupled to the given client device, the remote server including at least one remote processor and remote memory storing instructions that, when executed by the at least one remote processor, cause the at least one remote processor to:

receive, from the given client device, the corresponding candidate correction pair;

determine whether the corresponding candidate correction pair is a corresponding actual correction pair based on a threshold quantity of occurrences of the corresponding candidate correction pair being received from the given client device and/or a plurality of additional client devices that are in addition to the given client device; and in response to determining that the given corresponding candidate correction pair is a corresponding actual correction pair:

cause a global ASR model, that is a global-based counterpart of the corresponding on-device ASR models, to be updated in a decentralized manner and utilizing the given client device, that is associated with the corresponding candidate correction pair, and/or the plurality of additional client devices, that are also associated with the corresponding candidate correction pair.

\* \* \* \* \*